(12) United States Patent
Weaver et al.

(10) Patent No.: US 10,303,920 B2
(45) Date of Patent: May 28, 2019

(54) TECHNIQUES FOR CREATING CHARACTERIZATION MATRICES FOR REFLECTANCE, ILLUMINANCE, OR SENSOR RESPONSE

(71) Applicant: Lumenetix, Inc., Scotts Valley, CA (US)

(72) Inventors: Matthew D. Weaver, Aptos, CA (US); James Kingman, Woodside, CA (US); Jay Hurley, Aptos, CA (US); Jeffrey Saake, San Francisco, CA (US); Sanjoy Ghose, Pismo Beach, CA (US)

(73) Assignee: LUMENETIX, INC., Scotts Valley, CA (US)

( * ) Notice: Subject to any disclaimer, the term of this patent is extended or adjusted under 35 U.S.C. 154(b) by 0 days.

(21) Appl. No.: 16/030,705

(22) Filed: Jul. 9, 2018

(65) Prior Publication Data
US 2019/0012511 A1 Jan. 10, 2019

Related U.S. Application Data

(60) Provisional application No. 62/530,244, filed on Jul. 9, 2017.

(51) Int. Cl.
*G06K 9/00* (2006.01)
*H04N 5/341* (2011.01)
(Continued)

(52) U.S. Cl.
CPC .............. *G06K 9/0004* (2013.01); *G06K 9/66* (2013.01); *H04N 5/2256* (2013.01); *H04N 5/341* (2013.01); *G06K 2009/0006* (2013.01)

(58) Field of Classification Search
CPC .................. G06K 9/0004; G06K 9/66; G06K 2009/0006; H04N 5/2256; H04N 5/341
See application file for complete search history.

(56) References Cited

U.S. PATENT DOCUMENTS 8,136,967 B2 * 3/2012 Weaver ..................... F21V 3/04
362/327
8,284,279 B2 10/2012 Park et al.
(Continued)

OTHER PUBLICATIONS

Park, Jong-Il, et al., "Multispectral Imaging Using Multiplexed Illumination", International Conference on Computer Vision, Hanyang University, City of New York, Columbia University, 2007, 8 pages.

Primary Examiner — Shefali D Goradia
(74) Attorney, Agent, or Firm — Perkins Coie LLP

(57) ABSTRACT

Introduced here are computer programs and associated computer-implemented techniques for determining reflectance of an image on a per-pixel basis. More specifically, a characterization module can initially acquire a first data set generated by a multi-channel light source and a second data set generated by a multi-channel image sensor. The first data set may specify the illuminance of each color channel of the multi-channel light source (which is configured to produce a flash), while the second data set may specify the response of each sensor channel of the multi-channel image sensor (which is configured to capture an image in conjunction with the flash). Thus, the characterization module may determine reflectance based on illuminance and sensor response. The characterization module may also be configured to determine illuminance based on reflectance and sensor response, or determine sensor response based on illuminance and reflectance.

20 Claims, 32 Drawing Sheets
(6 of 32 Drawing Sheet(s) Filed in Color)

(51) Int. Cl.
*H04N 5/225* (2006.01)
*G06K 9/66* (2006.01)

(56) References Cited

U.S. PATENT DOCUMENTS

| | | | |
|---|---|---|---|
| 8,340,937 B2* | 12/2012 | Skinner | G01J 3/50 |
| | | | 702/104 |
| 9,778,109 B2 | 10/2017 | Park et al. | |
| 2006/0250519 A1 | 11/2006 | Kawakami | |
| 2011/0282613 A1* | 11/2011 | Skinner | G01J 3/50 |
| | | | 702/104 |
| 2013/0235551 A1 | 9/2013 | Hamada | |
| 2016/0088278 A1 | 3/2016 | Velarde et al. | |
| 2018/0284020 A1* | 10/2018 | Vauclin | G01J 3/10 |

* cited by examiner

| | Two-Channel Light Source | Five-Channel Light Source |
|---|---|---|
| CCT Range | Typical: 2500-5000K<br>Broadest: 2700-6000K | Typical: 1650-8000L<br>Broadest: 1100-20000K |
| Lumens | Peak: 800 (roof-shaped) | Peak: 1100 (plateau-shaped) |
| CRI (Ra/R9) | Spec: 90/50<br>Tested/Actual: 70/0 | Spec: 92-98<br>Tested/Actual: 92-98 |
| Delta UV (ΔUV) | Maximum: <0.008 | Maximum: <0.002 |
| Spectrum | Limited | Full |
| Delta E (ΔE) Color Error | 1.5-3.5 | <1 |
| Color Gamut Access | No | Yes |
| Rf | 73-88 | 95 |

1001
Illuminate ambient environment by activating illuminant(s) corresponding to all color channels except a first color channel 1002
Illuminate ambient environment by activating illuminant(s) corresponding to all color channels except a second color channel 1003
Illuminate ambient environment by activating illuminant(s) corresponding to all color channels except a third color channel 1004
Illuminate ambient environment by activating illuminant(s) corresponding to all color channels except a fourth color channel 1005
Illuminate ambient environment by activating illuminant(s) corresponding to all color channels except a fifth color channel 1006
Capture a series of images in conjunction with the series of substantially white flashes 1007
Illuminate ambient environment with a reference flash by activating illuminant(s) corresponding to all color channels 1008
Capture a reference image in conjunction with the reference flash 1009
Identify a spectral characteristic of each color channel and each sensor channel 1010
Calculate reflectance on a pixel-by-pixel basis based on the spectral characteristics

1701
Acquire a reference image with no added light and a series of images corresponding to the multiple color channels 1702
Subtract, for each pixel, the sensor values associated with the reference image from each image of the series of images 1703
Calculate reflectance on a per-pixel basis 1704
Receive input indicative of a selection of a new illuminant corresponding to a new illuminance profile 1705
Create a modified image by multiplying the new illuminance profile by the calculated reflectance on a per-pixel basis 1706
Store the modified image in a memory

1801
Illuminate a training set of reflectances by producing a series of colored flashes by illuminating each color channel of a multi-channel light source 1802
Capture a series of images in conjunction with the series of colored flashes 1803
Calculate fingerprint for each pixel of each image 1804
Set up linear regression using training fingerprints and values from training reflectances 1805
Perform multiple linear regression for each wavelength to form a reflectance characterization matrix 1806
Apply the reflectance characterization matrix to calculated fingerprints to present a reflectance profile of an object

2201
Illuminate reference reflectances by producing a series of flashes by illuminating a series of training illuminants 2202
Capture a series of images in conjunction with the series of flashes 2203
Calculate fingerprint for each training illuminant 2204
Set up linear regression using training fingerprints and values from training illuminants 2205
Perform multiple linear regression for each wavelength to form an illuminance characterization matrix 2206
Apply the illuminance characterization matrix to calculated fingerprints to present an illuminance profile of light reflected off the reference reflectances

2501
Capture a reference image of a color grid card with no added light and a series of images of the color grid card corresponding to the multiple color channels 2502
For each pixel, subtract the ambient RGB values from each of the series of images 2503
Calculate response curve for each color channel of the sensor

FIGURE 25

TECHNIQUES FOR CREATING CHARACTERIZATION MATRICES FOR REFLECTANCE, ILLUMINANCE, OR SENSOR RESPONSE

CROSS-REFERENCE TO RELATED APPLICATIONS

This application claims priority to U.S. Provisional Application No. 62/530,244, titled "Multi-Channel Full Color Spectrum Flash for Mobile Devices" and filed on Jul. 9, 2017, which is incorporated by reference herein in its entirety.

TECHNICAL FIELD

Various embodiments concern computer programs and associated computer-implemented techniques for determining reflectance, illuminance, and/or sensor response using a multi-channel light source and a multi-channel image sensor.

BACKGROUND

Traditional lighting technologies, such as incandescent bulbs and fluorescent bulbs, suffer from several drawbacks. For example, these lighting technologies do not have long lifespans or high energy efficiencies. Moreover, these lighting technologies are only offered in a limited selection of colors, and the light output by these lighting technologies generally changes over time as the source ages and begins to degrade. Consequently, light-emitting diodes (LEDs) have become an attractive option for many applications.

Many electronic devices include one or more image sensors for capturing images of the surrounding environment, such as a rear-facing camera or a front-facing camera. Each of these cameras is typically accompanied by at least one illuminant capable of providing robust luminosity across a wide field of view (FOV). Yet these illuminants are typically deficient in several respects.

For instance, LEDs embedded within electronic devices are often designed to produce a fixed white light with no tunable range. White light could be produced by combining a short-wavelength LED (e.g., one designed to produce blue light or ultraviolet light) and a yellow phosphor coating. Blue/ultraviolet photons generated by the short-wavelength LED will either travel through the phosphor layer without alteration or be converted into yellow photons in the phosphor layer. The combination of blue/ultraviolet photons and yellow photons produces white light (also referred to as "phosphor white light"). As another example, white light could be produced by a xenon flashlamp designed to produce extremely intense white light (also referred to as "xenon white light") for short durations.

When an image is captured by an electronic device under phosphor white light or xenon white light, the effect is roughly equivalent to capturing the image under a fluorescent light source. Thus, phosphor white light and xenon white light will not provide an accurately reflected color spectrum, nor will they have any vibrancy. Instead, these illuminants simply flood the ambient environment with white light so that objects can be readily identified within images.

Recent development has focused on developing light sources that include two illuminants corresponding to different correlated color temperatures (CCTs). While these light sources may be able to produce a mixed white light that more accurately matches the color of an ambient environment, they can further take away from the color quality. For example, when mixed white light drops below the Planckian locus (also referred to as the "black body locus") it may become pinkish in tone. Consequently, significant post-processing may be necessary to artificially recreate the original lighting of the ambient environment.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various features of the technology will become more apparent to those skilled in the art from a study of the Detailed Description in conjunction with the drawings. Embodiments of the technology are illustrated by way of example and not limitation in the drawings, in which like references may indicate similar elements.

This application contains at least one drawing executed in color. Copies of this application with color drawing(s) will be provided by the Office upon request and payment of the necessary fees.

Figure 1A:
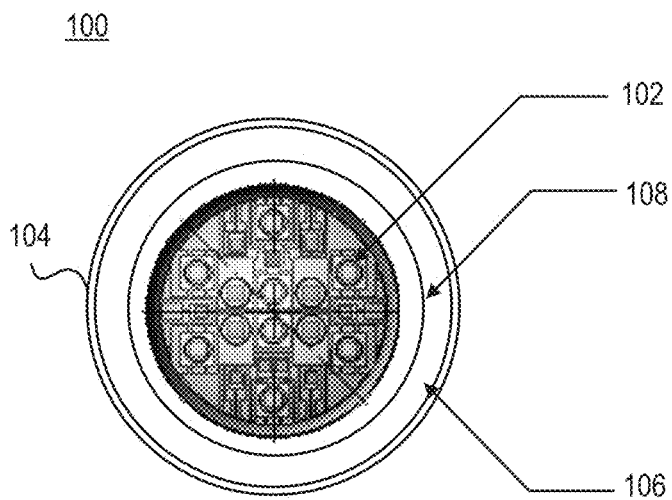

FIG. 1A depicts a top view of a multi-channel light source that includes multiple color channels that are configured to produce different colors.

Figure 1B:
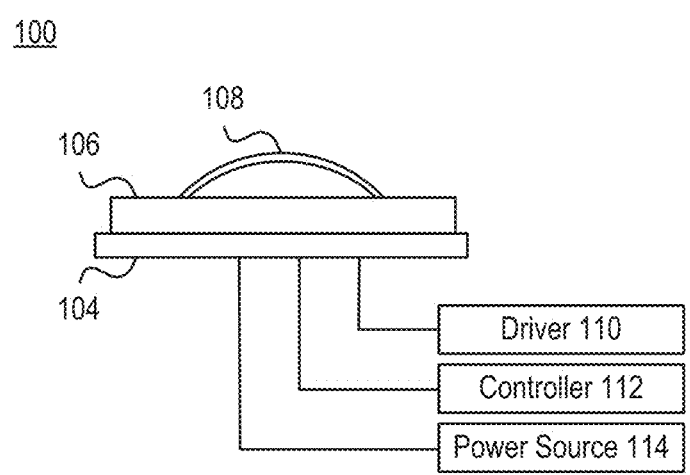

FIG. 1B depicts a side view of the multi-channel light source illustrating how, in some embodiments, the illuminants can reside within a housing.

Figure 1C:
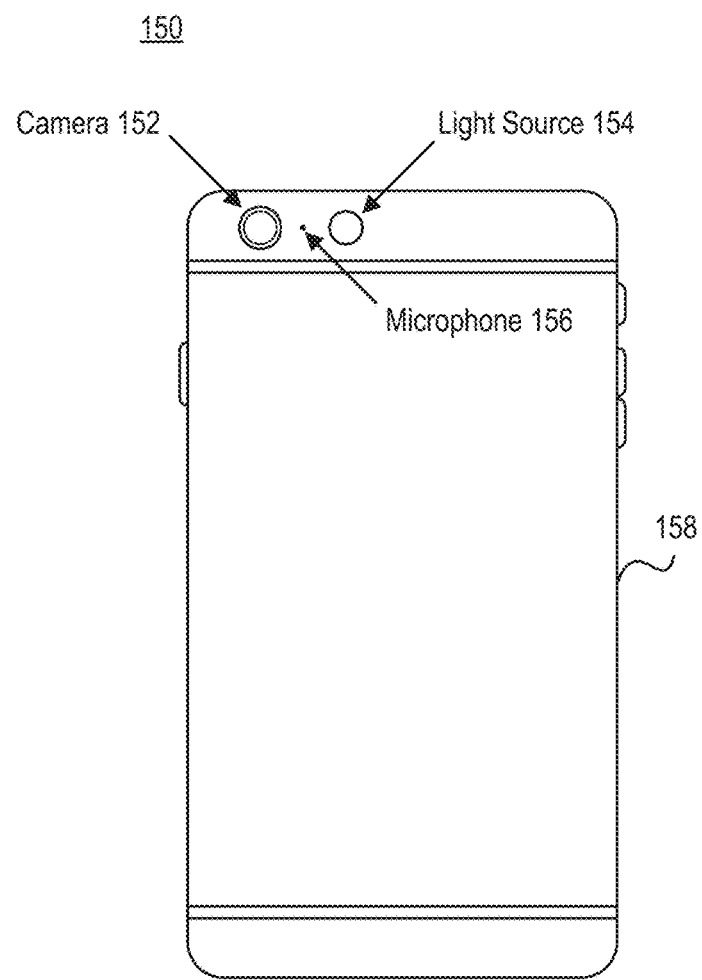

FIG. 1C depicts an electronic device that includes a rear-facing camera and a multi-channel light source configured to illuminate the ambient environment.

Figure 2:
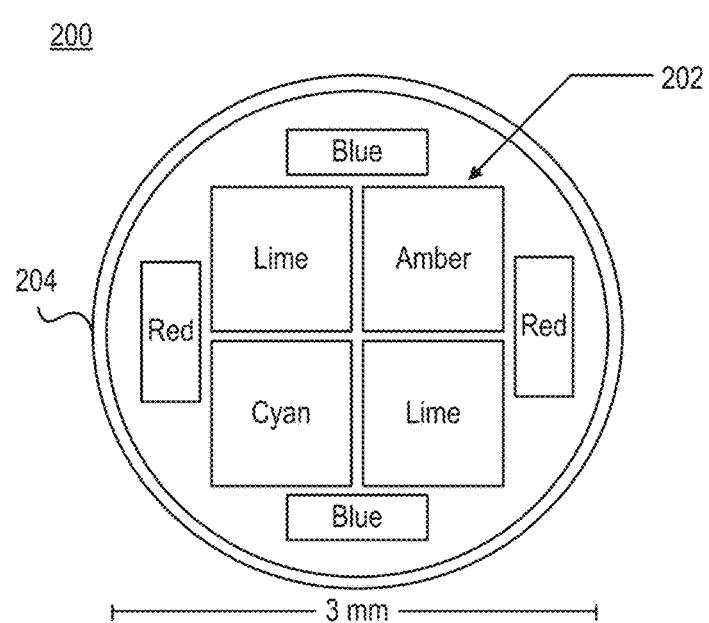

FIG. 2 depicts an example of an array of illuminants.

Figure 3A:
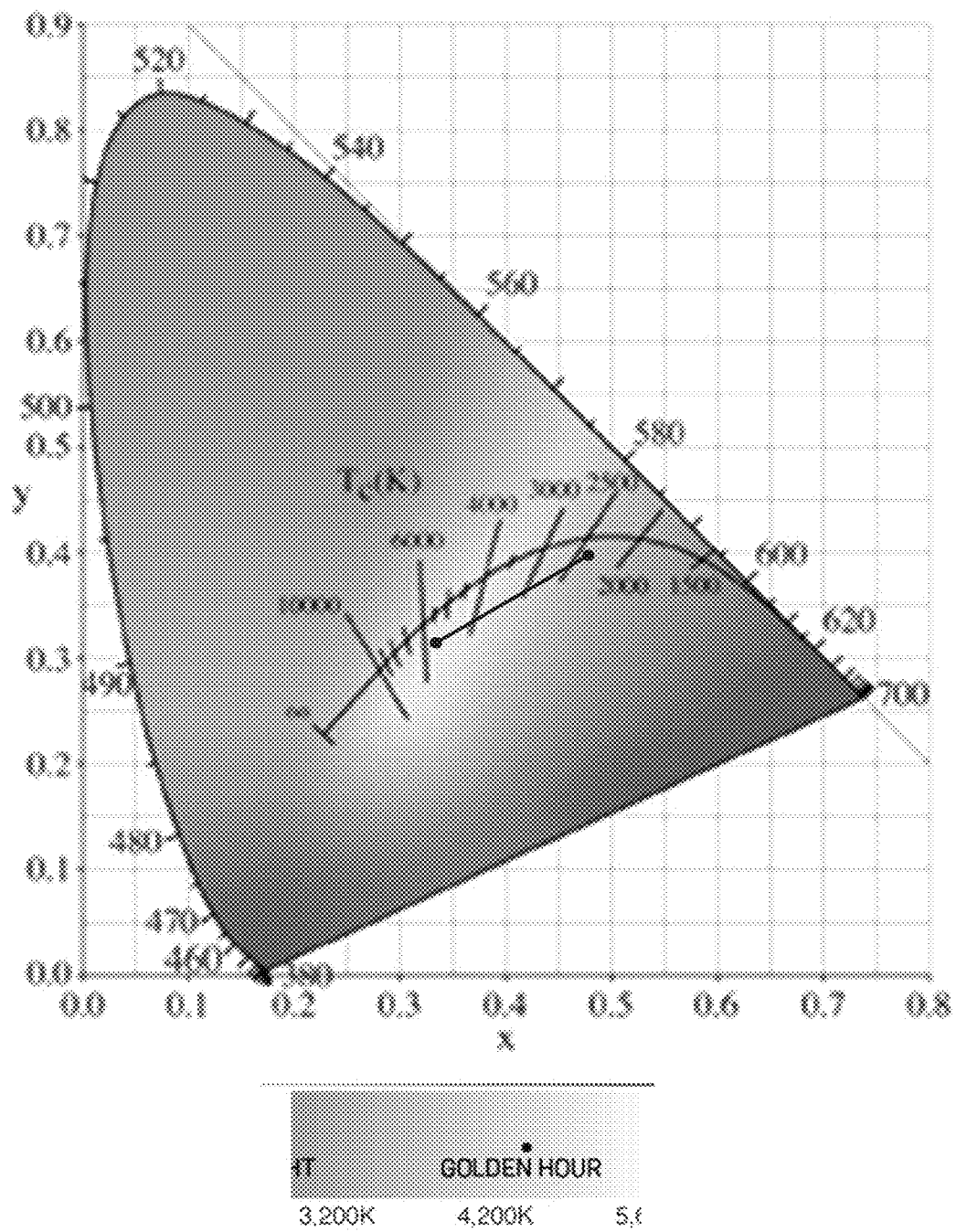

FIG. 3A illustrates the tunable range of a two-channel light source in comparison to the Planckian locus (also referred to as the "black body locus").

Figure 3B:
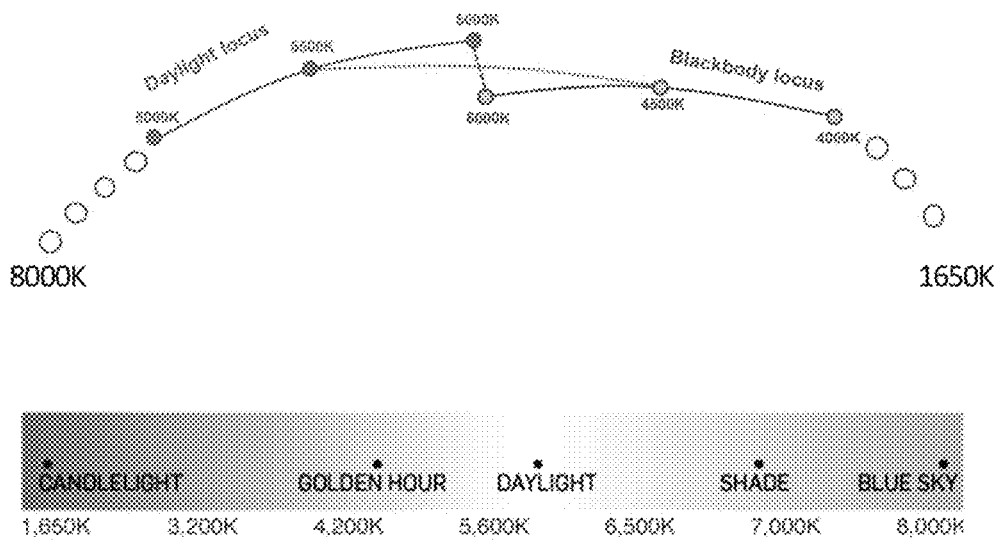

FIG. 3B illustrates the tunable range of a five-channel light source.

Figure 4A:
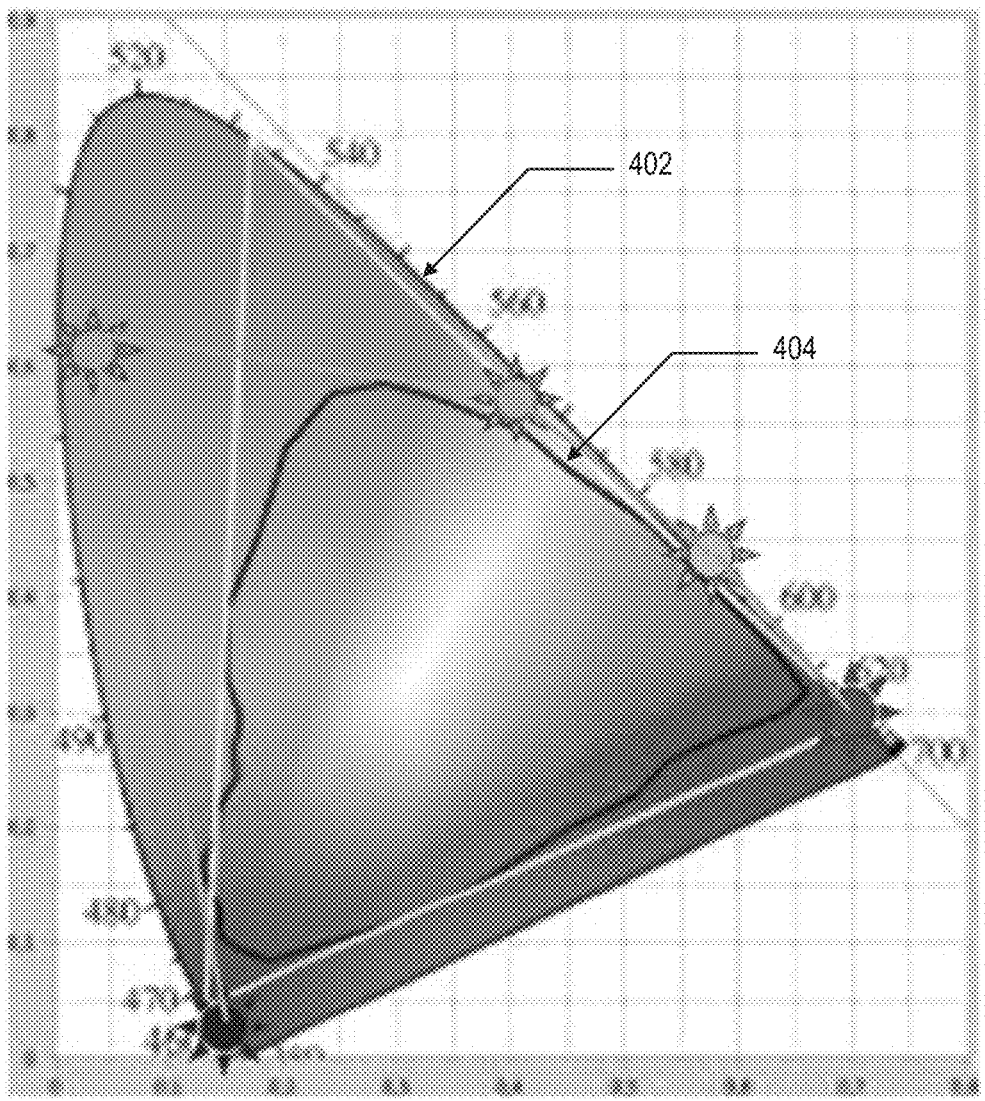

FIG. 4A illustrates the total achievable color gamut of a five-channel light source in comparison to a conventional chromaticity diagram.

Figure 4B:
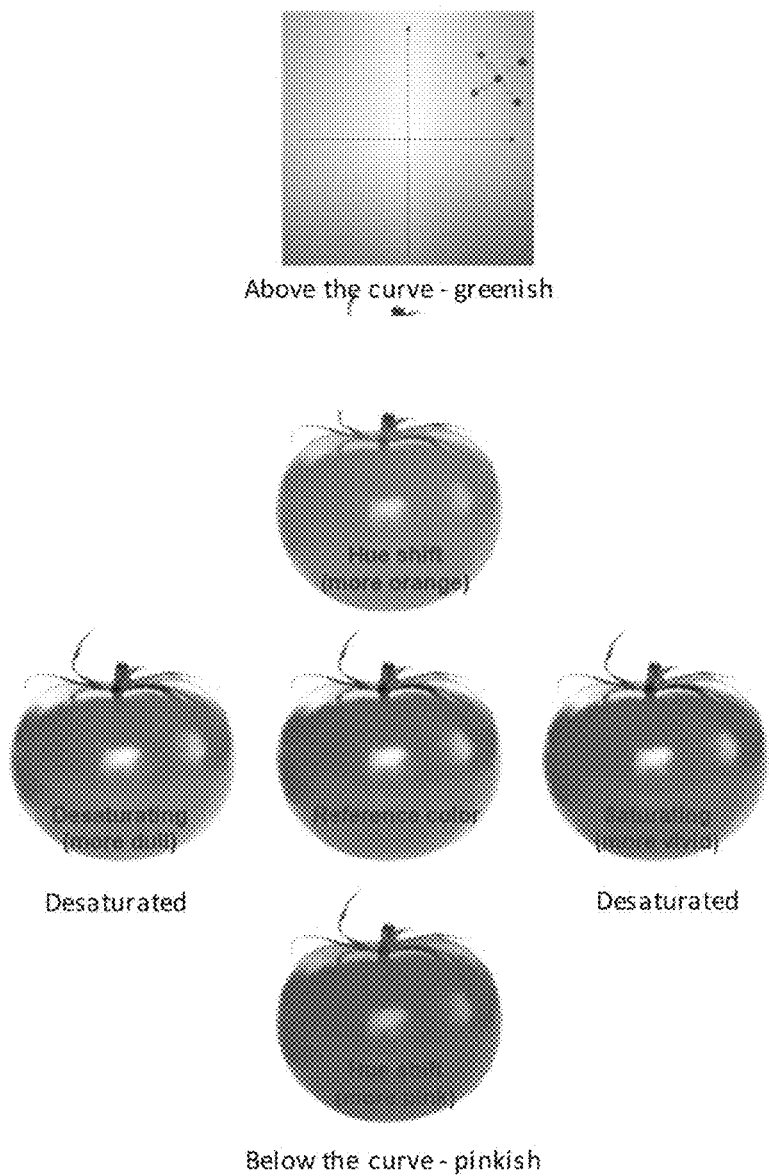

FIG. 4B illustrates the visual impact of Duv on images captured in conjunction with flashes of white light produced by a two-channel light source and a five-channel light source.

FIG. 5 illustrates how the human eye of an average individual will generally recognize improvements in color reproducibility (i.e., as measured in terms of $R_f$ and $R_g$ values).

Figure 6:
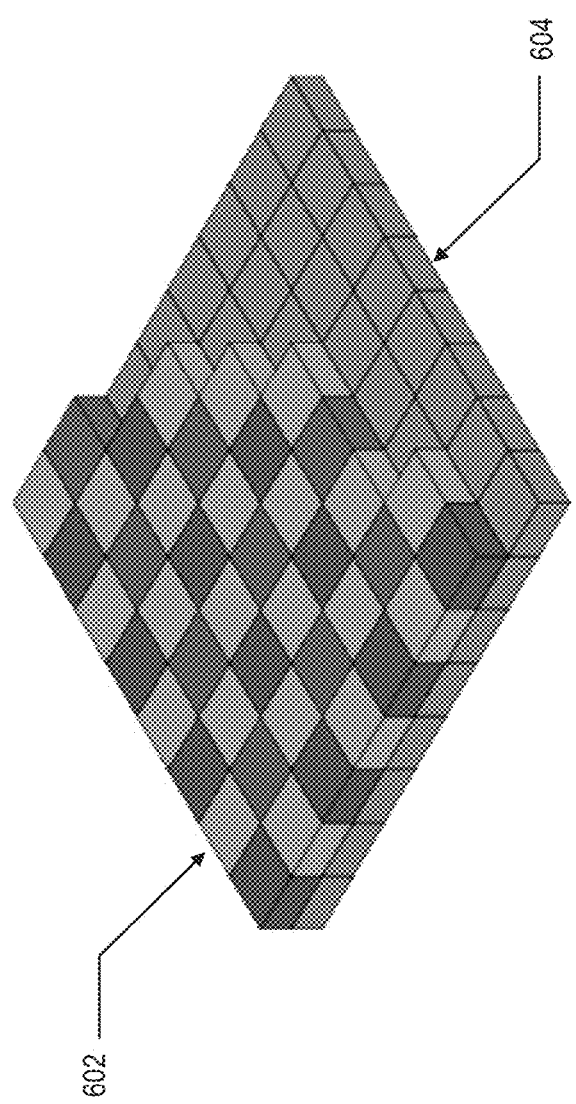

FIG. 6 depicts an example of a separation mechanism arranged over an image sensor.

Figure 7:
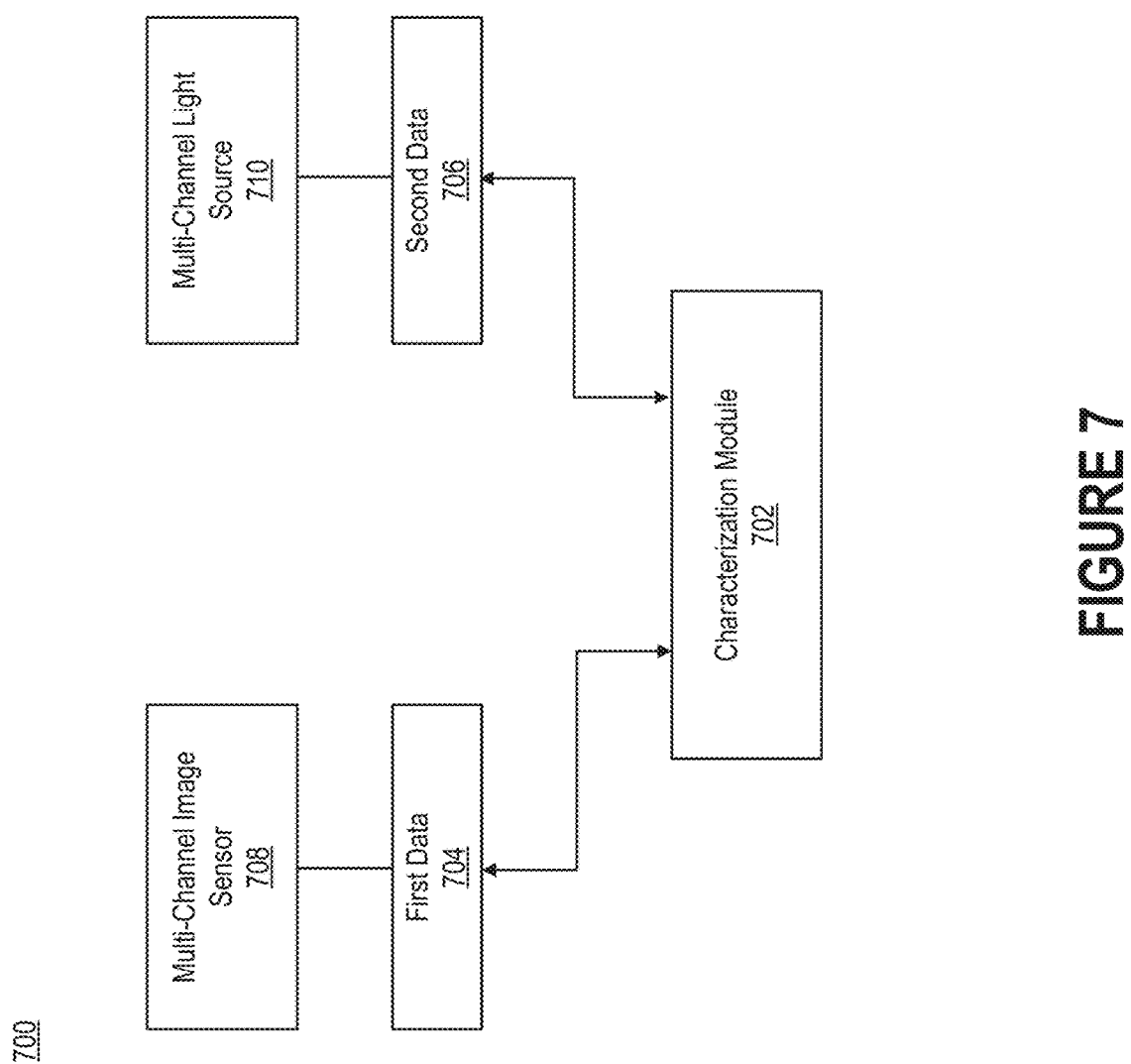

FIG. 7 depicts an example of a communication environment that includes a characterization module configured to determine an image feature based on two different types of data.

Figure 8:
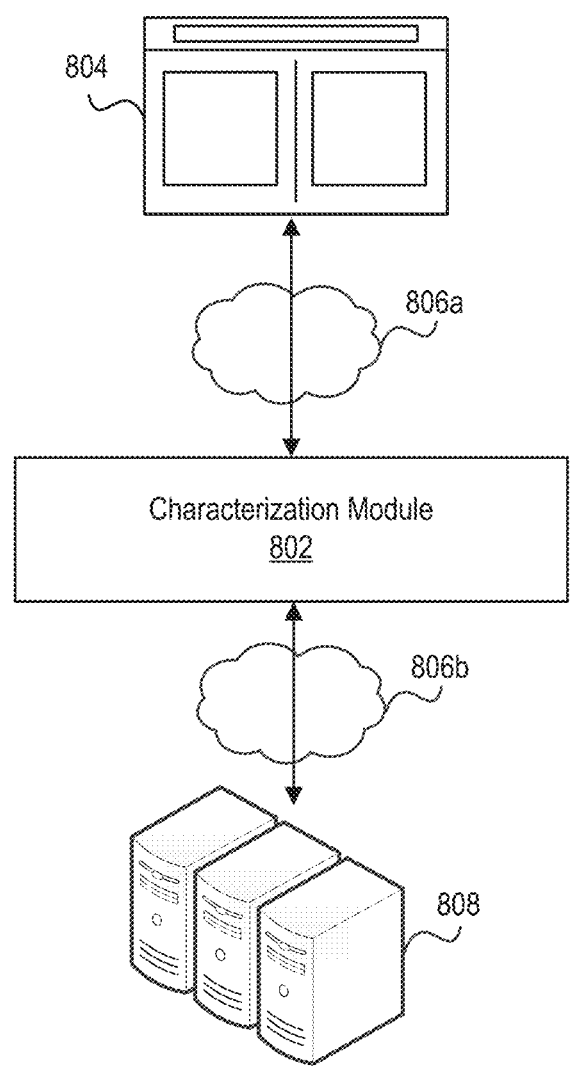

FIG. 8 illustrates a network environment that includes a characterization module (also referred to as a "solver module" or "fast inverse solver").

Figure 9:
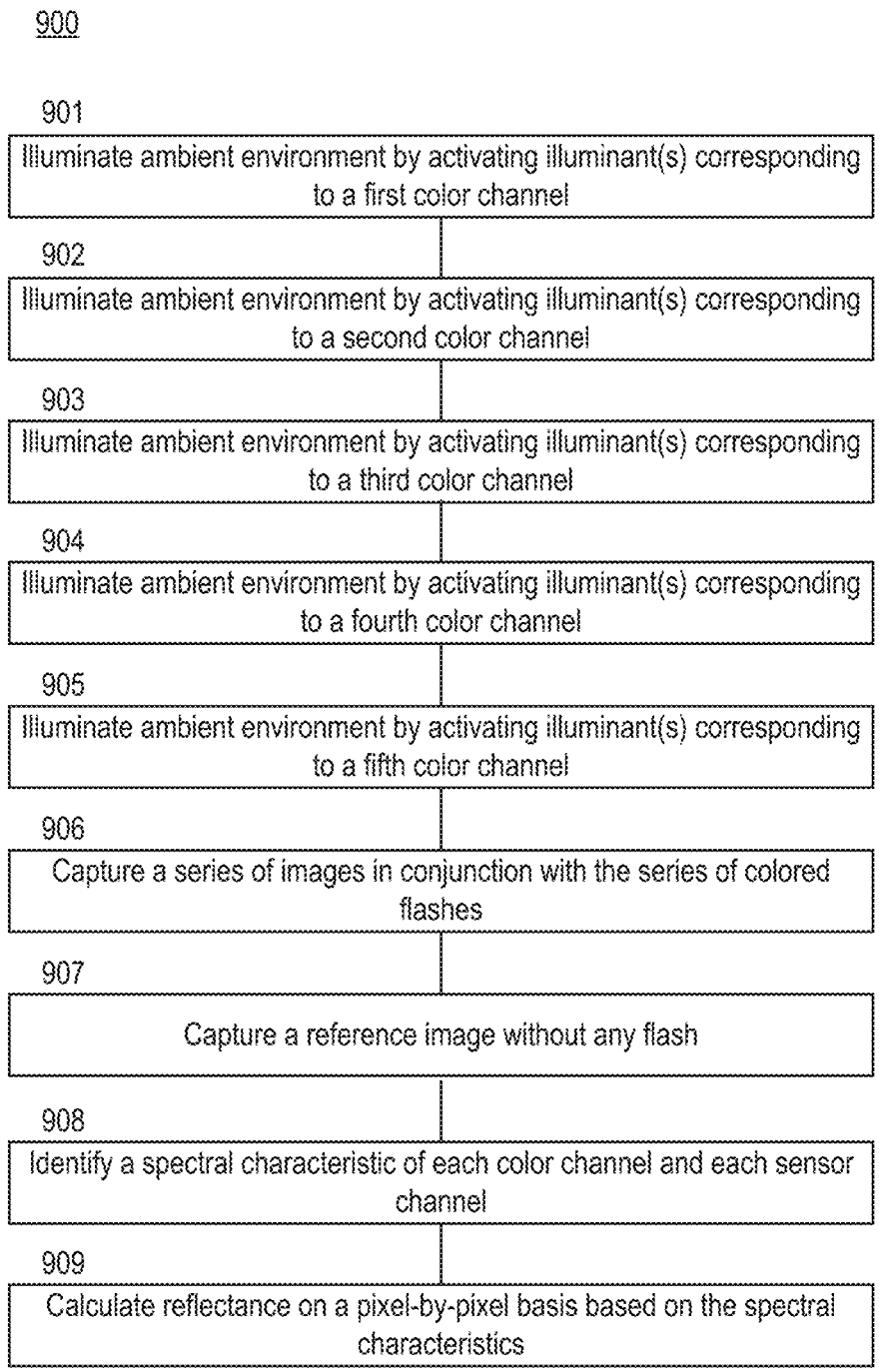

FIG. 9 illustrates a process for acquiring color information that may be useful in estimating reflectance on a pixel-by-pixel basis.

FIG. 10 illustrates another process 1000 for acquiring color information that may be useful in estimating reflectance on a pixel-by-pixel basis.

Figure 11:
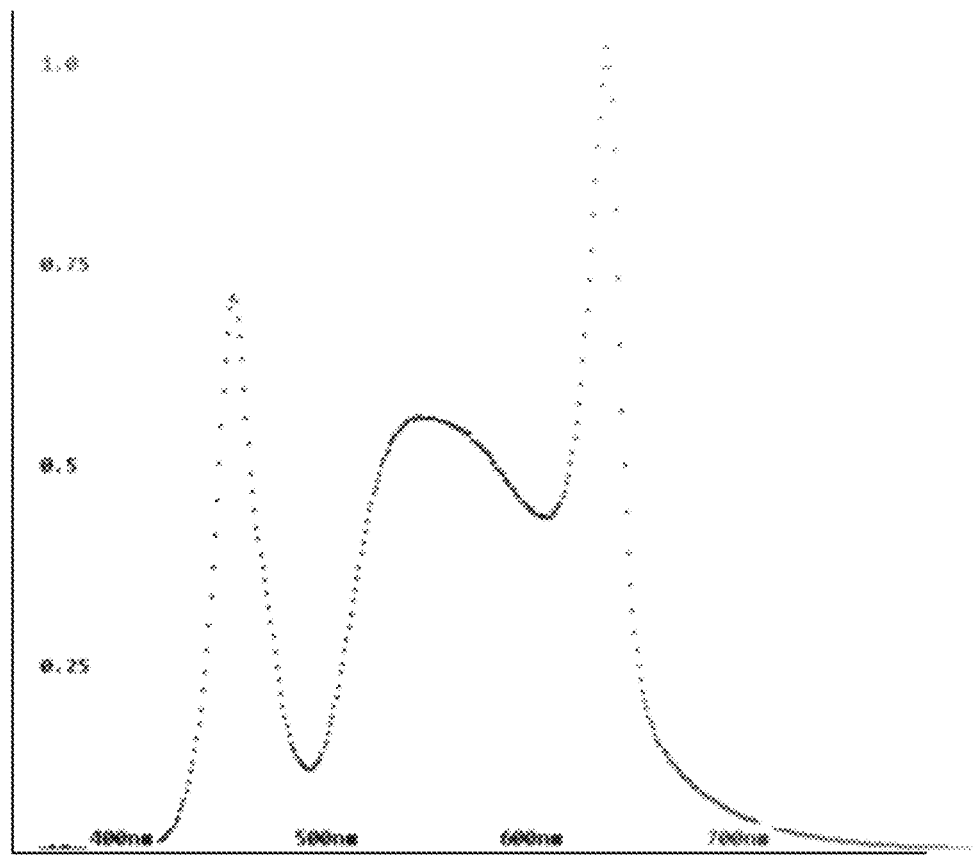

FIG. 11 illustrates an example plot of illuminance over the visible spectrum for a given color channel of a multi-channel light source.

Figure 12:
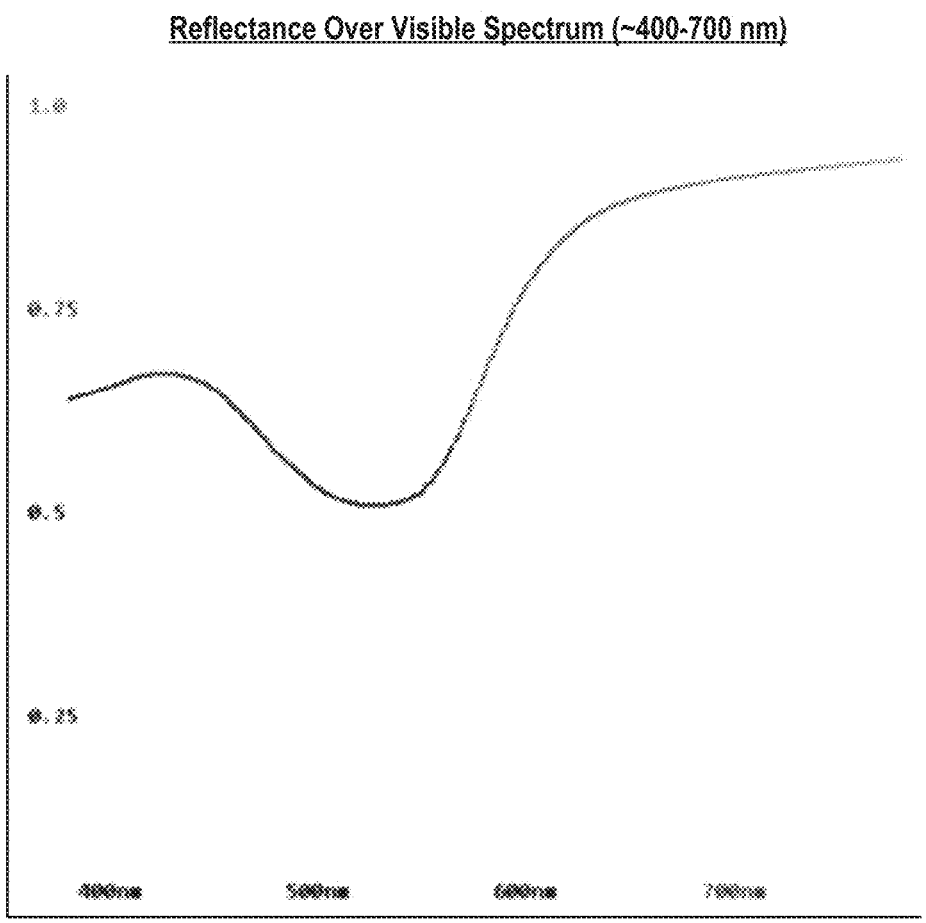

FIG. 12 illustrates an example plot of reflectance over the visible spectrum for a given pixel of an image.

Figure 13:
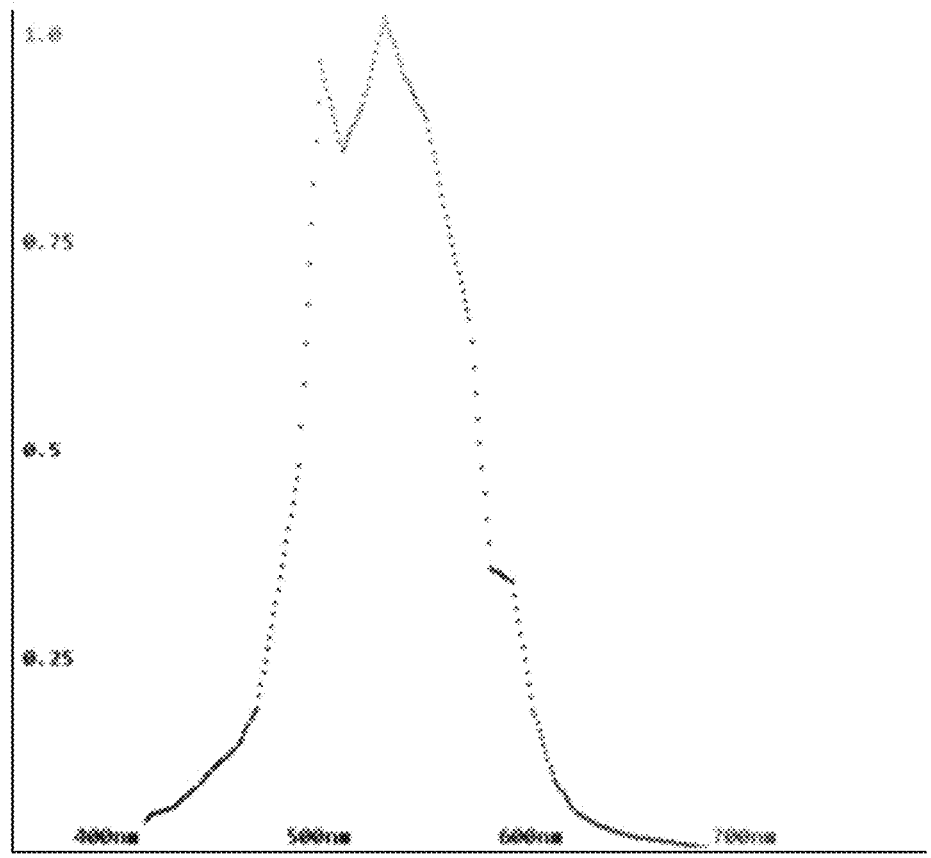

FIG. 13 illustrates an example plot of the response of a given sensor channel of a multi-channel image sensor.

Figure 14:
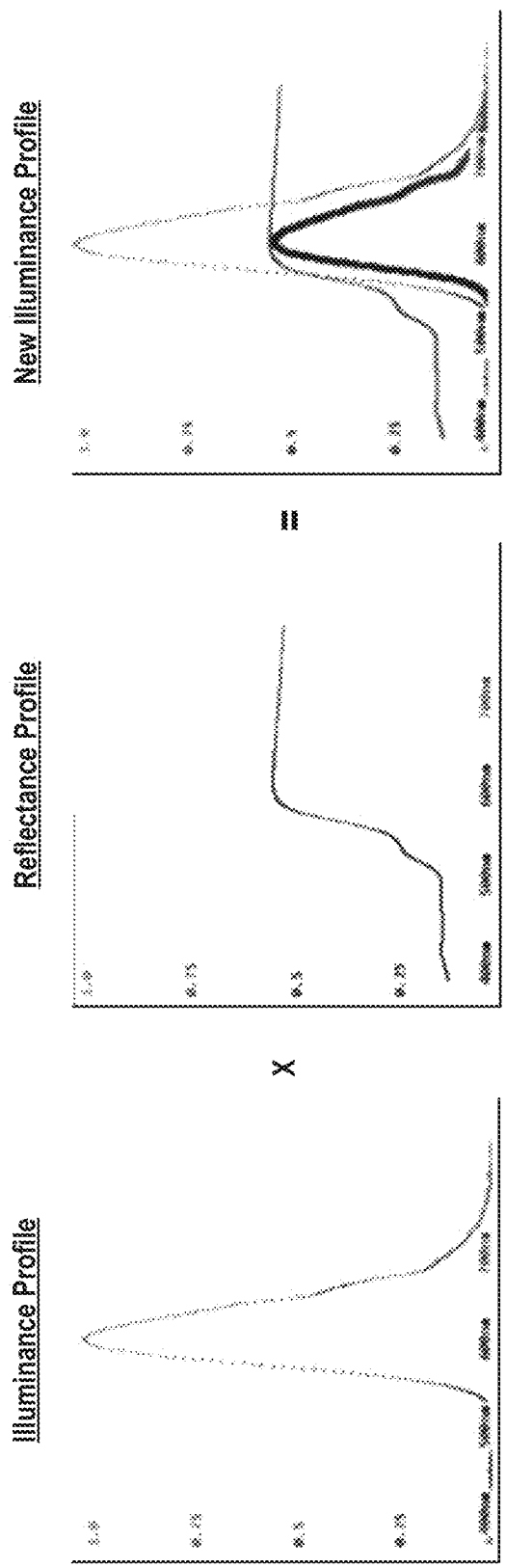

FIG. 14 illustrates how multiplying an illuminance profile (also referred to as an "illuminant SPD") by a reflectance profile may result in a new illuminance profile (also referred to as a "new illuminant SPD").

Figure 15:
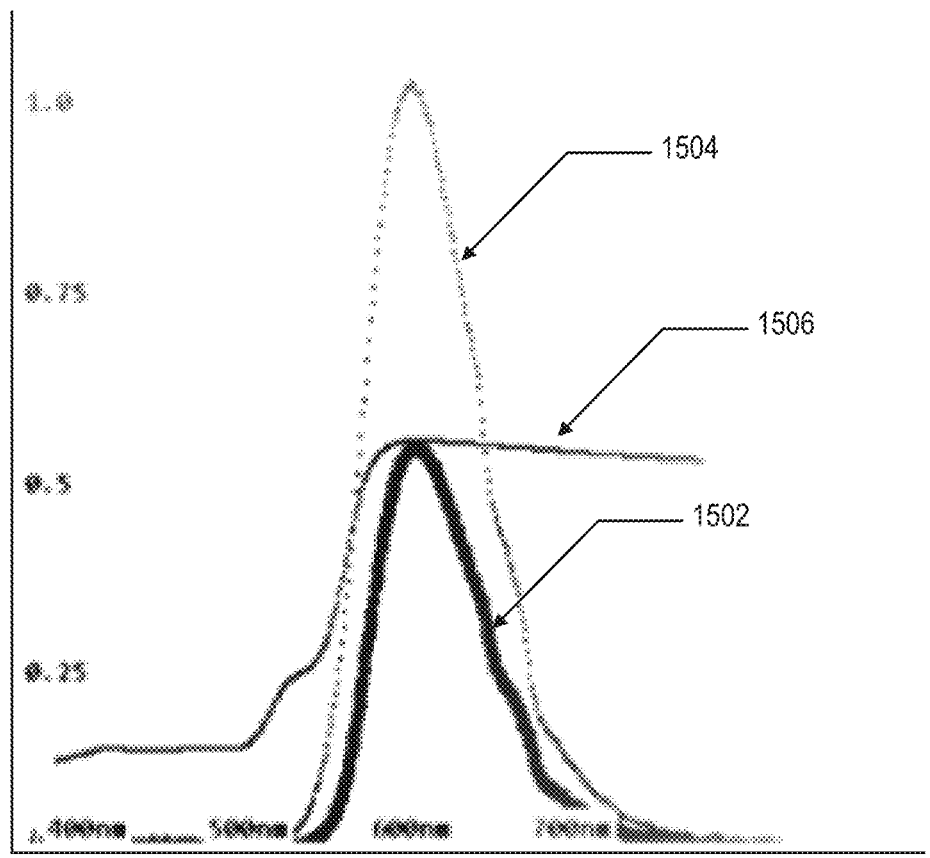

FIG. 15 depicts a response profile corresponding to a given sensor channel of a multi-channel image sensor.

Figure 16:
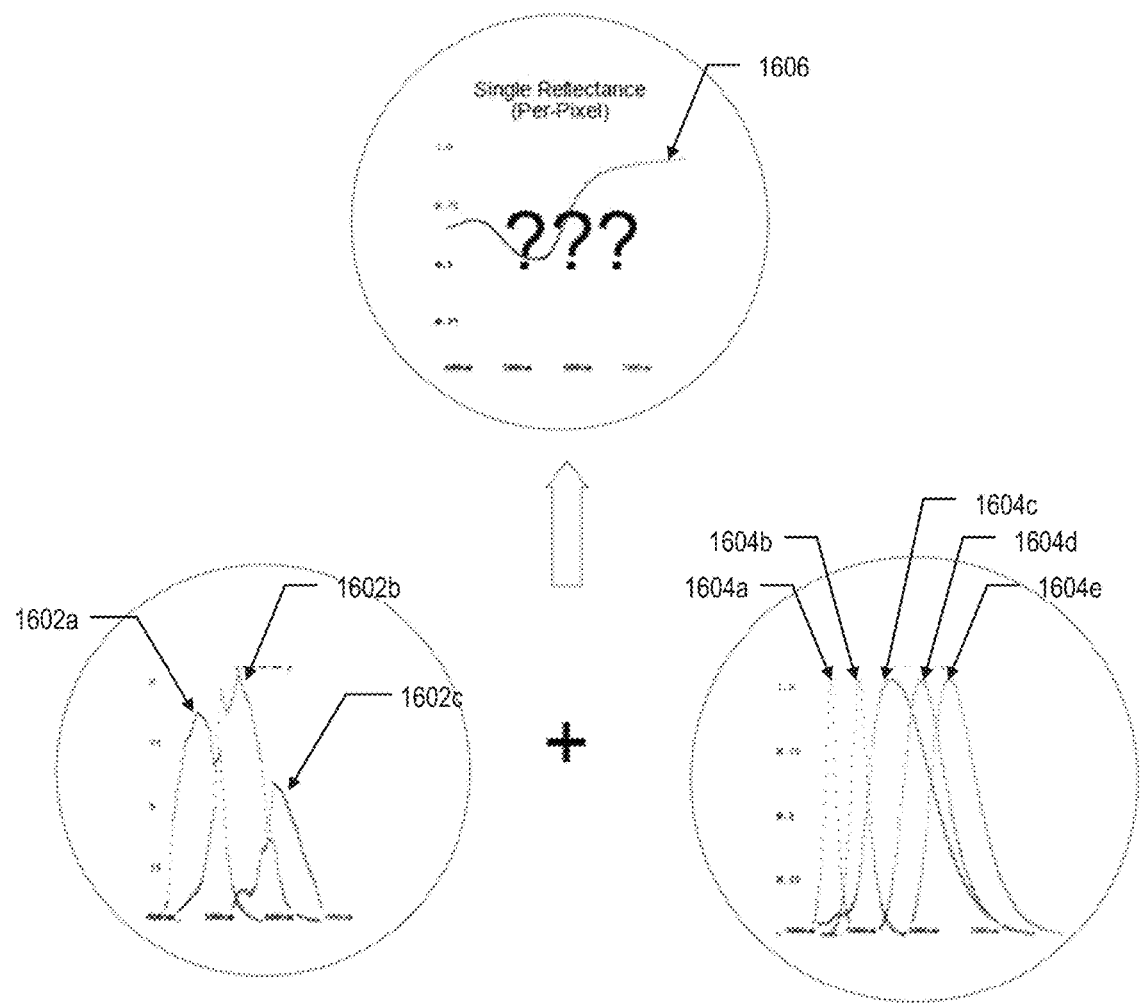

FIG. 16 depicts how, given response profiles for each sensor channel of a multi-channel image sensor and illuminance profiles for each color channel of a multi-channel light source, a reflectance profile can be created.

FIG. 17 illustrates a process for simulating the effect of a different light on a scene by altering an image during post-processing.

FIG. 18 illustrates a process for estimating the reflectance of an object based on a series of fingerprints.

Figure 19:
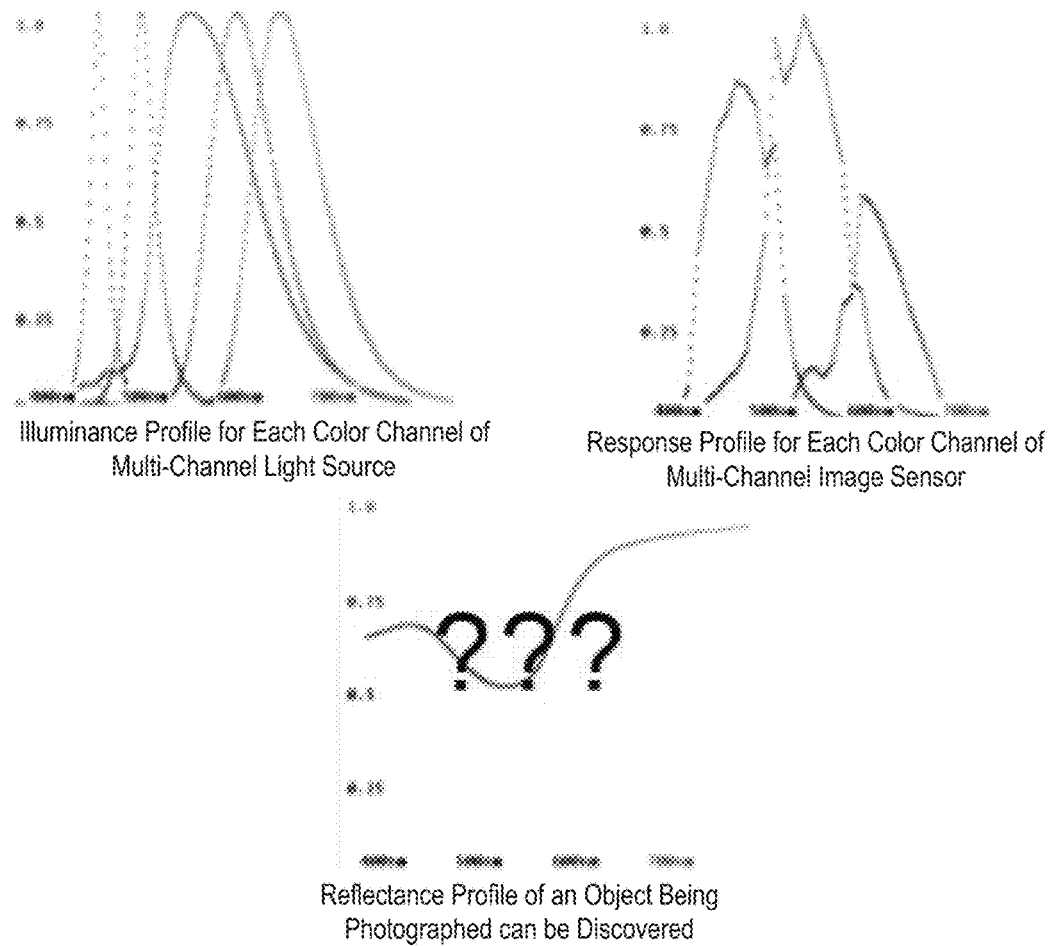

FIG. 19 illustrates how, given an illuminance profile for each color channel of a multi-channel light source and a response profile for each sensor channel of a multi-channel image sensor, the reflectance of an object being imaged can be extrapolated by a characterization module.

Figure 20:
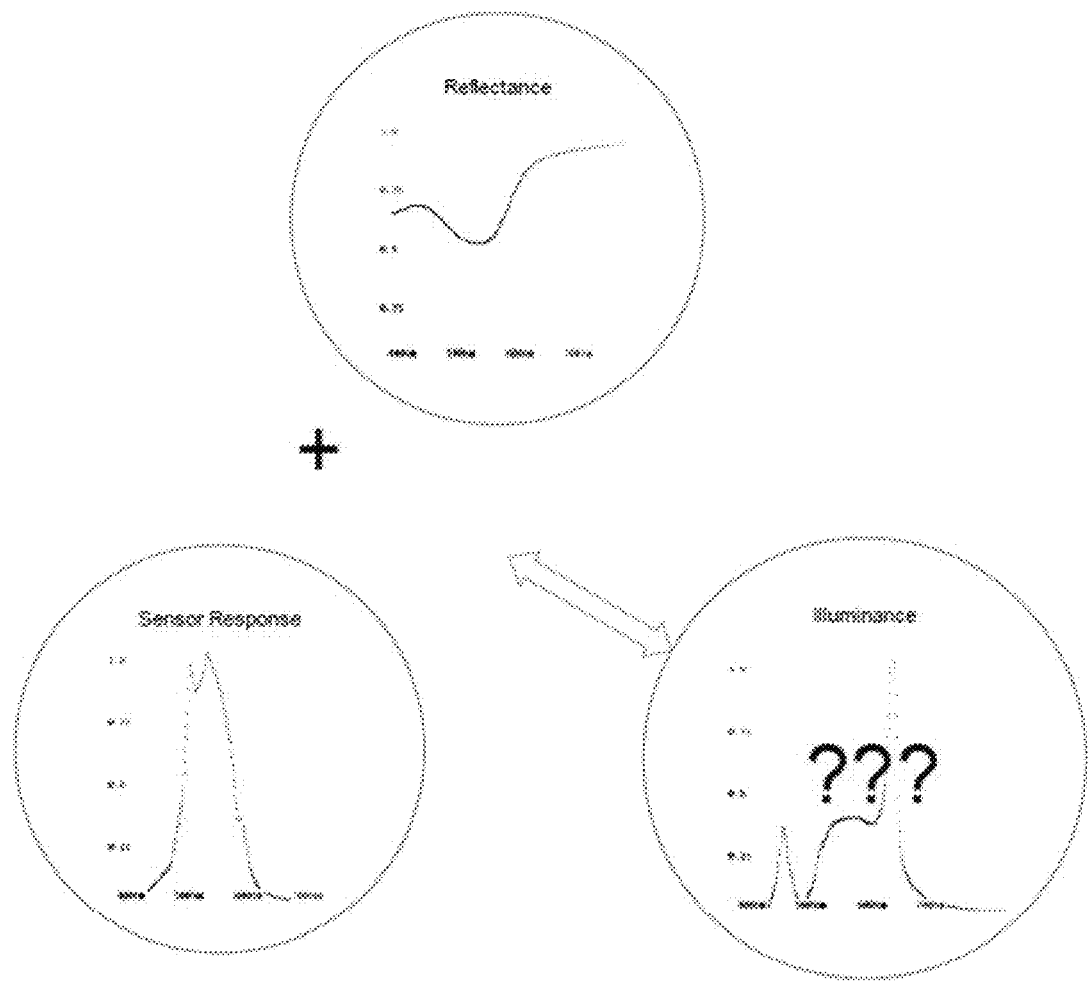

FIG. 20 depicts how, given response profiles for each sensor channel of a multi-channel image sensor and reflectance profiles for various imaged objects, an illuminance profile can be created.

Figure 21:
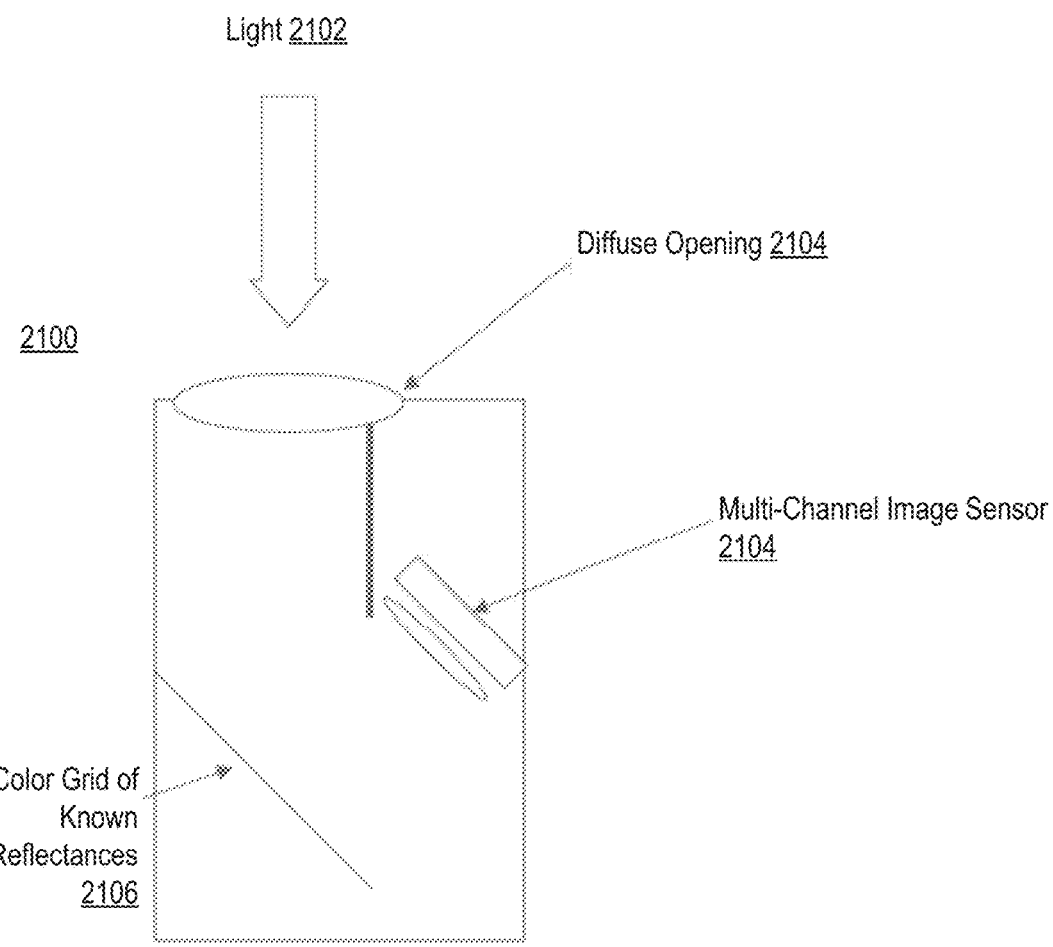

FIG. 21 illustrates an example of a spectrometer that makes use of the technology described herein.

FIG. 22 illustrates a process for estimating the illuminance based on a series of fingerprints.

Figure 23:
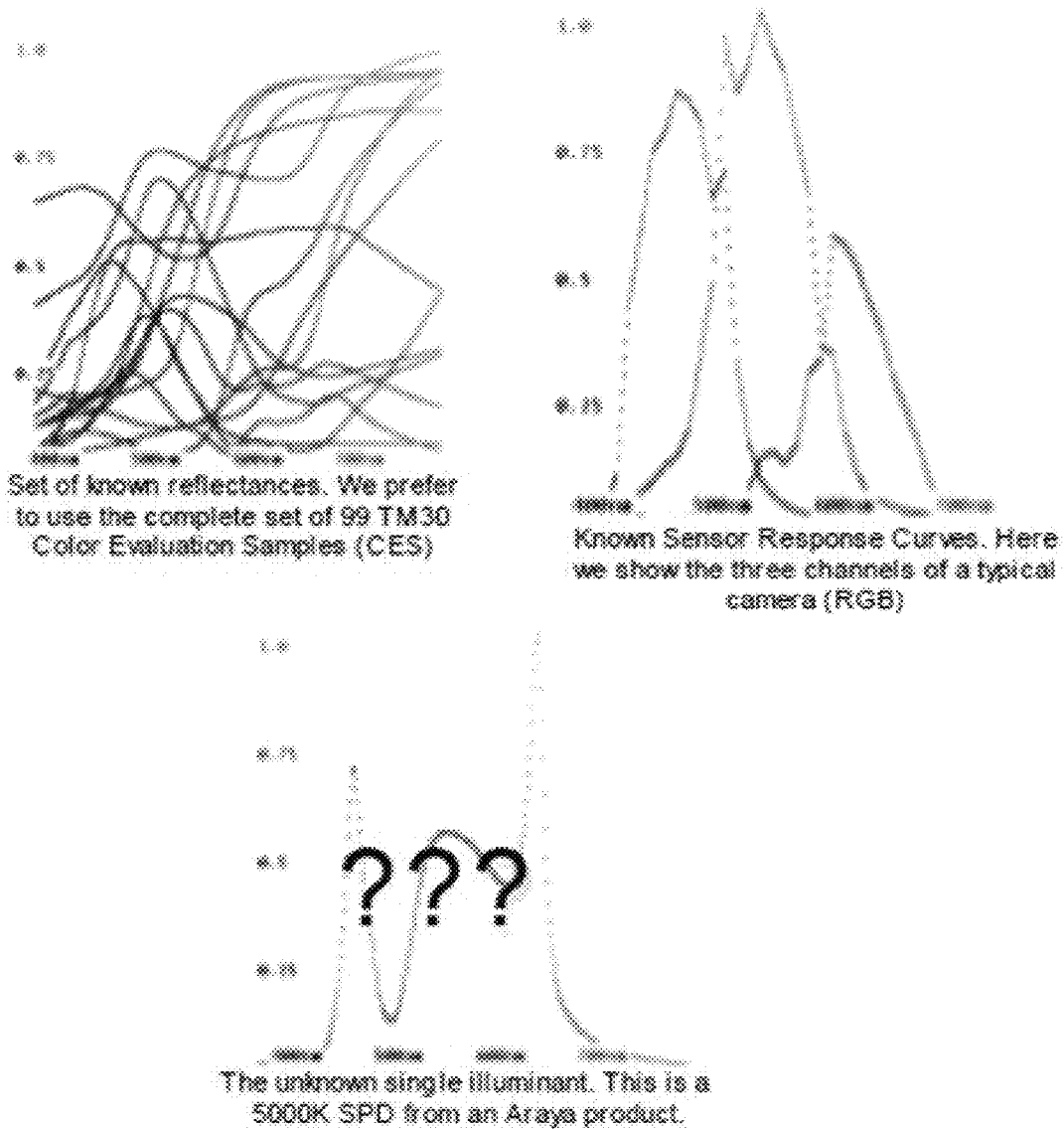

FIG. 23 illustrates how, given a reflectance profile for each of multiple reference reflectances and a response profile for each sensor channel of a multi-channel image sensor, the illuminance profile of light emitted by an illuminant can be extrapolated by a characterization module.

Figure 24:
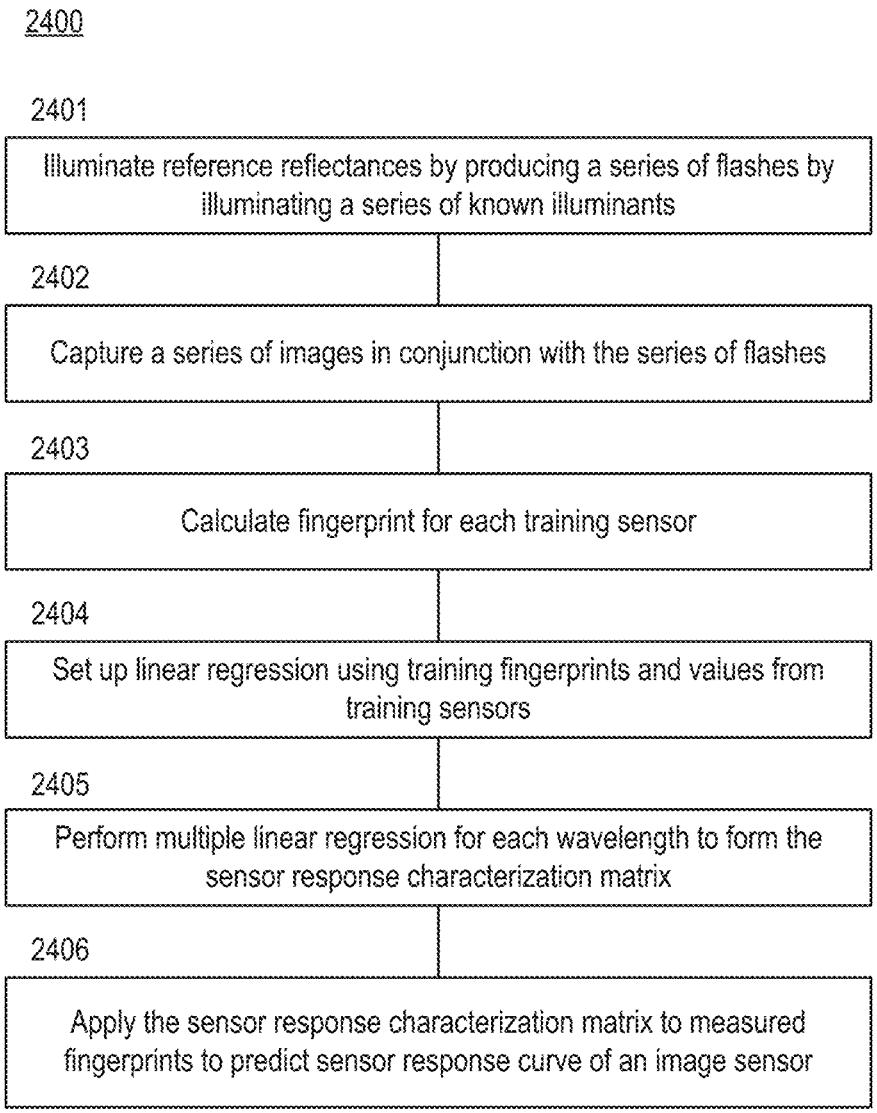

FIG. 24 illustrates a process for estimating the response of a multi-channel image sensor based on a series of fingerprints.

FIG. 25 illustrates a process for extrapolating the response profile for a multi-channel image sensor.

Figure 26:
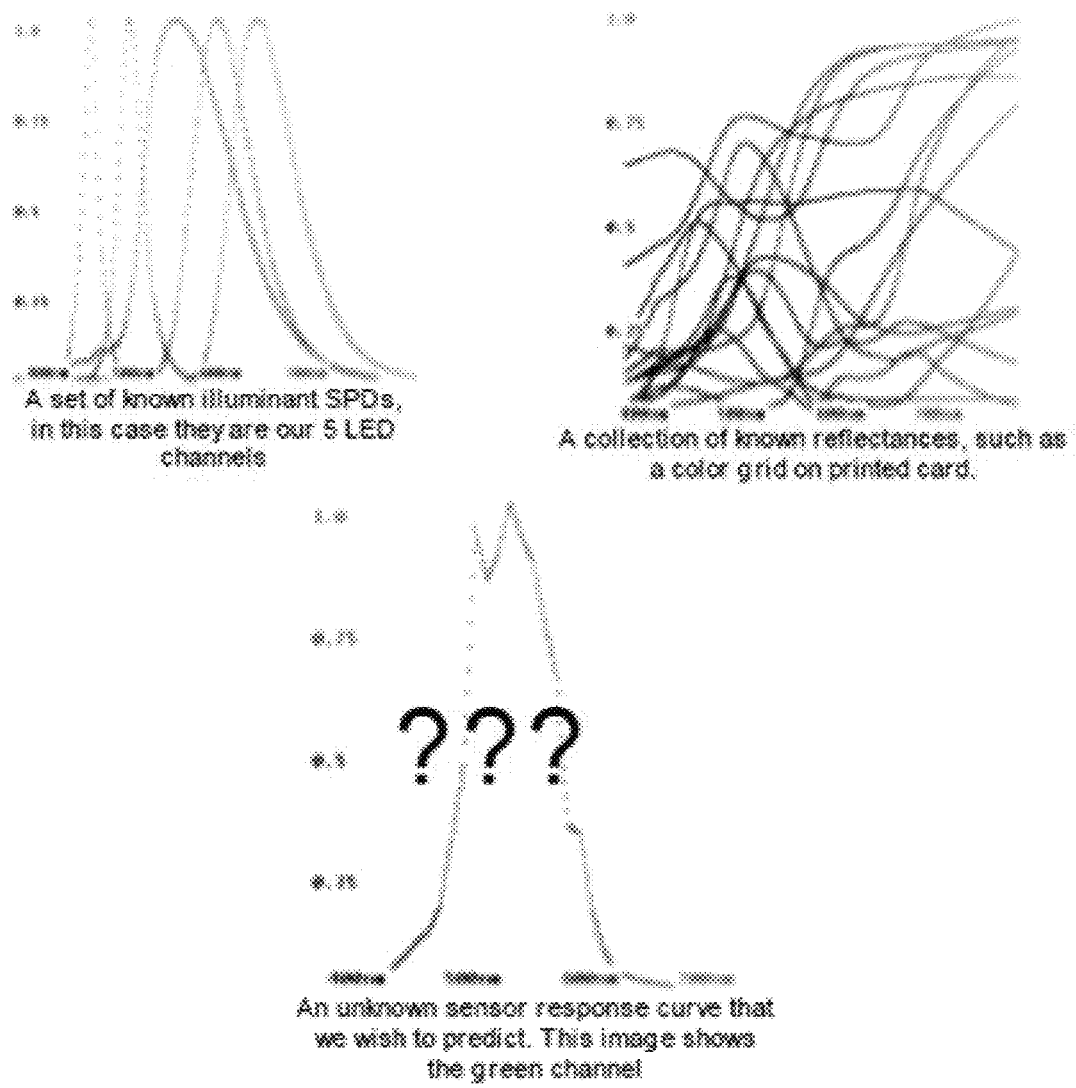

FIG. 26 illustrates how, given a reflectance profile for each of multiple reference reflectances and an illuminance profile for each of multiple reference illuminants, a response profile can be created.

Figure 27A:
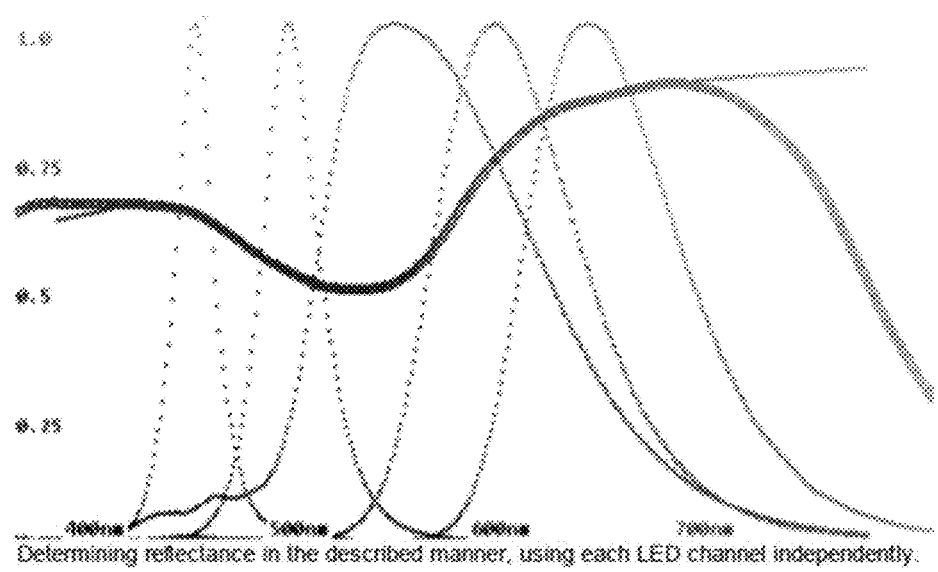

FIG. 27A illustrates how illuminance of each color channel of a multi-channel light source can be determined by independently driving each color channel.

Figure 27B:
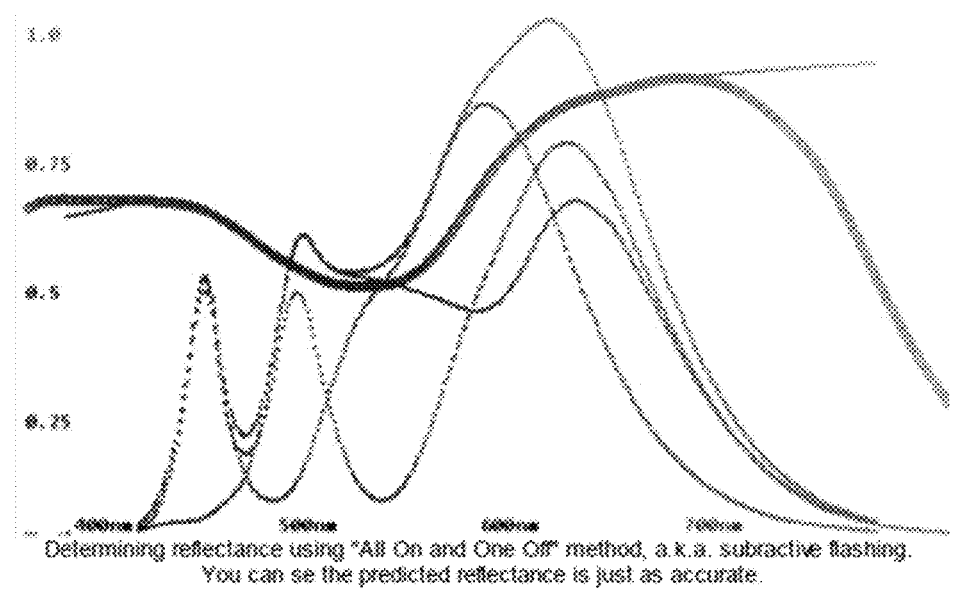

FIG. 27B illustrates how illuminance of each color channel of a multi-channel light source can be determined via subtractive flashing (also referred to as the "all-on-and-one-off method").

Figure 28A:
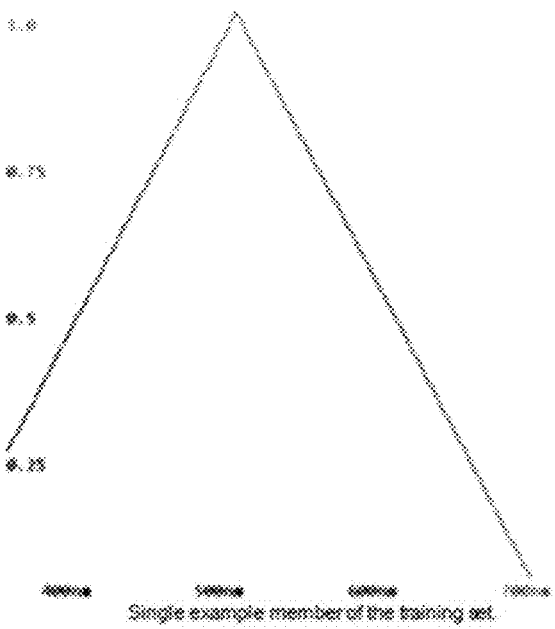

FIG. 28A illustrates a single member of a training set.

Figure 28B:
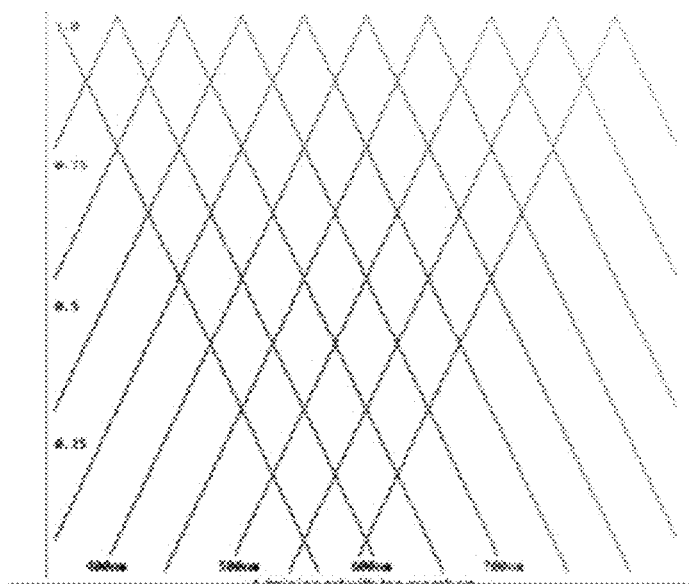

FIG. 28B illustrates of an entire training set that includes a series of individual members that sweep across the domain of interest.

Figure 29:
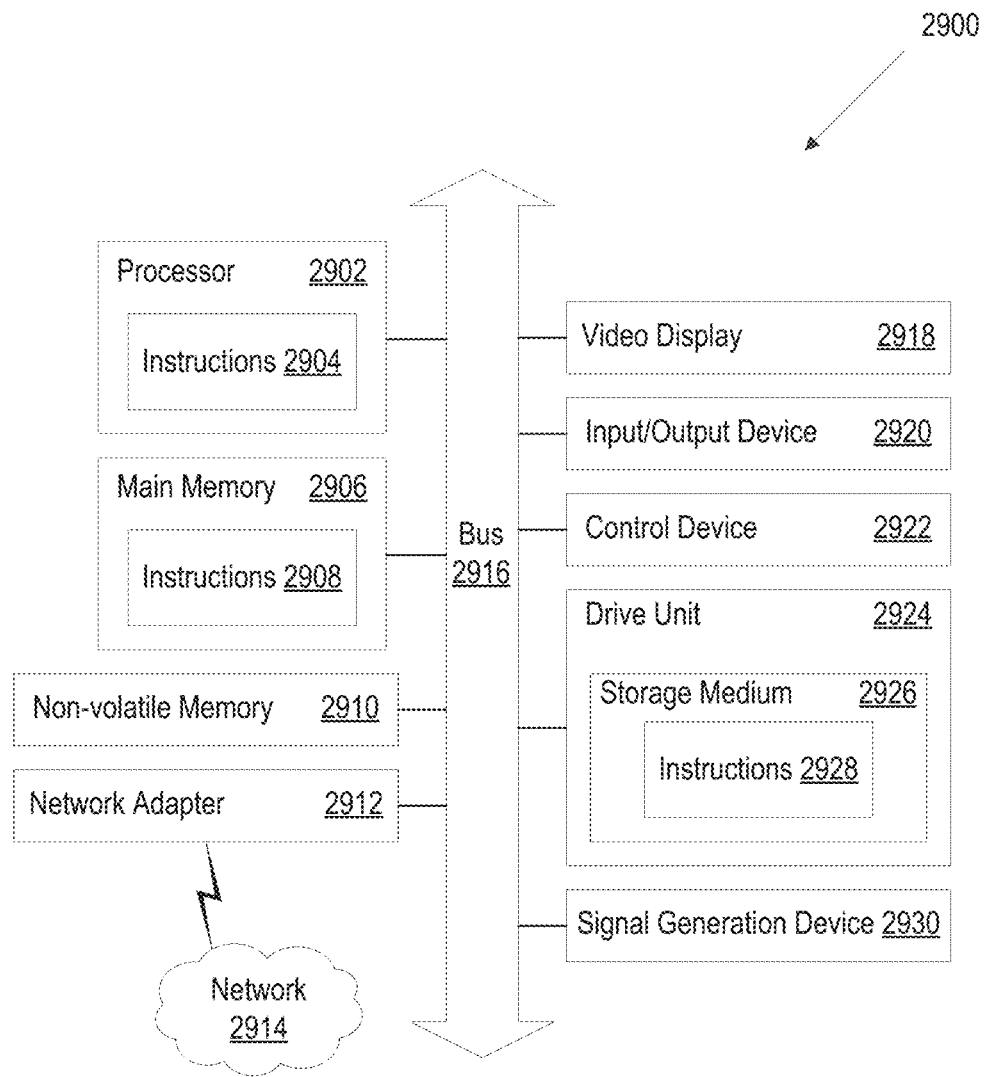

FIG. 29 is a block diagram illustrating an example of a processing system in which at least some operations described herein can be implemented.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

An illuminant can be characterized by its color temperature and color rendering index (CRI). The color temperature of an illuminant is the temperature at which the color of light emitted from a heated black body is matched by the color of the illuminant. For an illuminant that does not substantially emulate a black body, such as a fluorescent bulb or a light-emitting diode (LED), the correlated color temperature (CCT) of the illuminant is the temperature at which the color of light emitted from a heated black body is approximated by the color of the illuminant.

CCT can also be used to represent the chromaticity of illuminants that are configured to generate white light. Because chromaticity is a two-dimensional characterization, Duv (as defined by the American National Standards Institute (ANSI) C78.377) may be used to provide another dimension. When used with a MacAdam ellipse, CCT and Duv allow the visible color output by an illuminant to be more precisely controlled (e.g., by being tuned). The MacAdam ellipse represents all colors that are distinguishable to the human eye.

CRI, which is measured on a scale from 1-100, indicates how accurately an illuminant renders the color(s) of an illuminated object in comparison to an ideal or natural light source. If the illuminant is an LED, CRI is calculated by measuring the CRI ratings for eight different colors (i.e., R1-R8) and then averaging them out. However, the measured average fails to account for R9 (i.e., red) and R13 (i.e., skin tone), which are often useful in mixing/reproducing the other colors (e.g., to make skin tones appear more natural).

Reflectance characterizes the effectiveness of a surface in reflecting radiant energy. The reflectance spectrum (also referred to as the "spectral reflectance curve"), which represents the fraction of incident electromagnetic power reflected by the surface as a function of wavelength, is often useful in improving optics, imaging, etc.

To establish the reflectance spectra of a surface, an interested party (e.g., a researcher) may use a monochromator. A monochromator is an optical device that transmits a selectable, narrow band of wavelengths of light. For instance, a monochromator may perform a series of illumination events by sequentially shining different wavelengths toward the surface. For each illumination event, a reflectance measurement indicative of the light reflected by the surface can be generated by a single-pixel image sensor. A reflectance spectrum for the surface can be created from the reflectance measurements associated with the different wavelengths.

However, monochromators suffer from several drawbacks. For example, monochromators having high precision (e.g., those able to generate all/most wavelengths in the visible spectrum) are often very expensive. As another example, deployment of a monochromator may be inconvenient, inappropriate, or impossible in some scenarios.

Introduced here, therefore, are computer programs and associated computer-implemented techniques for determining reflectance of an image on a per-pixel basis. More specifically, a characterization module can initially acquire a first data set generated by a multi-channel light source and a second data set generated by a multi-channel image sensor. The first data set may specify the illuminance of each color channel of the multi-channel light source (which is configured to produce a flash), while the second data set may specify the response of each sensor channel of the multi-channel image sensor (which is configured to capture an image in conjunction with the flash). The characterization module can estimate reflectance on a per-pixel basis based on the first and second data sets.

Thus, the characterization module may determine reflectance based on illuminance and sensor response. As further described below, the characterization module may also be configured to determine illuminance based on reflectance and sensor response, or determine sensor response based on illuminance and reflectance.

Embodiments may be described with reference to particular electronic devices, light sources, or image sensors. For example, the technology may be described in the context of mobile phones that include a multi-channel light source and a multi-channel image sensor. However, those skilled in the art will recognize that these features are equally applicable to other types of electronic devices, light sources, and image sensors.

Moreover, the technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a light source to perform a process for controllably producing white light (e.g., in the form of a flash) having a high gamut area by mixing the colored light produced by multiple color channels.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, objects may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program stored in a memory accessible to a multi-channel light source may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Light Source Overview

FIG. 1A depicts a top view of a multi-channel light source 100 that includes multiple color channels that are configured to produce different colors. Each color channel can include one or more illuminants 102 of a substantially similar color. For example, the multi-channel light source 100 may include a single illuminant configured to produce a first color, multiple illuminants configured to produce a second color, etc. Note that, for the purpose of simplification, a color channel may be said to have "an illuminant" regardless of how many separate illuminants the color channel includes.

One example of an illuminant is an LED. An LED is a two-lead illuminant that is generally comprised of an inorganic semiconductor material. While embodiments may be described in the context of LEDs, the technology is equally applicable to other types of illuminant. Table I includes several examples of available colors of LEDs, as well as the corresponding wavelength range, voltage drop, and semiconductor material(s).

TABLE I

Range (in nanometers) in which the dominant wavelength resides, voltage drop, and representative materials for available colors of LEDs.

| Color | Dominant Wavelength | Representative Materials |
|---|---|---|
| Infrared | $\lambda > 760$ | Gallium arsenide; and Aluminum gallium arsenide |
| Red | $610 < \lambda < 760$ | Aluminum gallium arsenide; Gallium arsenide phosphide; Aluminum gallium indium phosphide; and Gallium(III) phosphide |
| Orange | $590 < \lambda < 610$ | Gallium arsenide phosphide; Aluminum gallium indium phosphide; and Gallium(III) phosphide |
| Yellow | $570 < \lambda < 590$ | Gallium arsenide phosphide; Aluminum gallium indium phosphide; and Gallium(III) phosphide |
| Green | $500 < \lambda < 570$ | Aluminum gallium phosphide; Aluminum gallium indium phosphide; Gallium(III) phosphide; Indium gallium nitride; and Gallium(III) nitride |
| Blue | $450 < \lambda < 500$ | Zinc selenide; and Indium gallium nitride |
| Violet | $400 < \lambda < 450$ | Indium gallium nitride |
| Ultraviolet | $\lambda < 400$ | Indium gallium nitride; Diamond; Boron nitride; Aluminum nitride; Aluminum gallium nitride; and Aluminum gallium indium nitride |

Other colors not shown in Table I may also be incorporated into the light source 100. Examples of such colors include cyan ($490 < \lambda < 515$), lime ($560 < \lambda < 575$), amber ($580 < \lambda < 590$), and indigo ($425 < \lambda < 450$). Those skilled in the art will recognize that these wavelength ranges are simply included for the purpose of illustration.

As noted above, a multi-channel light source 100 includes multiple color channels that are configured to produce different colors. For example, the light source 100 may include three separate color channels configured to produce blue light, green light, and red light. Such light sources may be referred to as "RGB light sources." As another example, the light source 100 may include four separate color channels configured to produce blue light, green light, red light, and either amber light or white light. Such light sources may be referred to as "RGBA light sources" or "RGBW light sources." As another example, the light source 100 may include five separate color channels configured to produce blue light, cyan light, lime light, amber light, and red light. As another example, the light source 100 may include seven separate color channels configured to produce blue light, cyan light, green light, amber light, red light, violet light, and white light. Thus, the light source 100 could include three channels, four channels, five channels, seven channels, etc.

While three-channel light sources and four-channel light sources improve upon conventional flash technologies, they may have a lumpy spectral distribution or narrow range of high fidelity. Consequently, the multi-channel light source 100 will often include at least five different color channels. As the number of color channels increases, the light quality, CCT range, and quality over range will also generally increase. For example, a five-channel light source having properly selected illuminants can be designed to deliver full-spectrum white light over a broad CCT range (e.g., from 1650K to over 10000K) with CRI/R9 values greater than 90 (e.g., with a typical Ra average value of 94) at $\Delta uV$ of ±0.002. Multi-channel light sources able to a color error of less than one (i.e., $\Delta E<1$) may be referred to as "high-fidelity light sources." Gradients of color could also be added to match the tint of a scene.

Due to their low heat production, LEDs can be located close together. Thus, if the illuminants 102 of the multi-channel light source are LEDs, then the light source 100 may include an array comprised of multiple dies placed arbitrarily close together. Note, however, that the placement may be limited by "whitewall" space between adjacent dies. The whitewall space is generally on the order of approximately 0.1 millimeters (mm), though it may be limited (e.g., no more than 0.2 mm) based on the desired diameter of the light source 100 as a whole. In FIG. 2, for example, the array includes eight dies associated with five different colors Such an array may be sized to fit within similar dimensions as conventional flash technology. The array may also be based on standard production die(s) requiring, for example, a 2-1-1-0.5-0.5 area ratio of lime-amber-cyan-red-blue. The array may be driven by one or more linear field-effect transistor-based (FET-based) current-regulated drivers. In some embodiments, each color channel is configured to be driven by a corresponding driver. These drivers may be affixed to, or embedded within, a substrate 104 arranged beneath the illuminants 102.

By controllably driving each color channel on an individual basis, the multi-channel light source 100 can produce white light at different CCTs. For example, the multi-channel light source 100 may produce a high-fidelity flash in conjunction with the capture of an image by an electronic device. Said another way, the light source 100 may generate a high-fidelity flash to illuminate the scene being photographed by an electronic device. Examples of electronic devices include mobile phones, tablet computers, digital cameras (e.g., single-lens reflex (SLR) cameras, digital SLR (DSLR) cameras, and light-field cameras, which may also be referred to as "plenoptic cameras"), etc. White light produced by the multi-channel light source 100 can improve the quality of images taken in the context of consumer photography, prosumer photography, professional photography, etc.

In some embodiments, the multi-channel light source 100 is able to produce colored light by separately driving the appropriate color channel(s). For example, a controller may cause the multi-channel light source 100 to produce a colored light by driving a single color channel (e.g., a red color channel to produce red light) or a subset of the color channels (e.g., a red color channel and an amber color channel to produce orange light). As noted above, the controller may also cause the multi-channel light source 100 to produce white light having a desired CCT by simultaneously driving each color channel. More specifically, the controller may be configured to determine, based on a color mixing model, one or more operating parameters required to achieve the desired CCT. The operating parameter(s) may specify, for example, the driving current to be provided to each color channel. By varying the operating parameter(s), the controller can tune the CCT of the white light as necessary.

Although the illuminants 102 are illustrated as an array of LEDs positioned on a substrate 104, other arrangements are also possible. In some cases, a different arrangement may be preferred (e.g., due to thermal constraints, size constraints, color mixing constraints, etc.). For example, the multi-channel light source 100 may include a circular arrangement, grid arrangement, or cluster of LEDs.

In some embodiments, the multi-channel light source 100 is communicatively coupled to an optical sensor (e.g., a photodiode) configured to generate optical feedback indicative of the brightness level of each color channel. For example, the multi-channel light source 100 may include multiple optical sensors corresponding to different bandwidths. In such embodiments, the optical feedback may specify multiple light intensities corresponding to optical sensors designed to examine different bandwidths, thereby allowing color shift in a color channel to be readily discovered. As another example, the light source 100 may include multiple optical sensors, and each optical sensor may be configured to measure the brightness of a corresponding color channel. The optical sensor(s) may be arranged along the upper surface of the substrate 104.

The multi-channel light source 100 may also include a heat sensor (e.g., a thermistor) configured to measure thermal feedback. The heat sensor may measure thermal feedback periodically to determine whether aging has affected the output of the illuminants 102. Similar to the optical sensor(s), the heat sensor may be arranged along the upper surface of the substrate 104.

A multivariate state estimator may be responsible for thermal management of the multi-channel light source 100 may be executed by a controller (e.g., a processor) that is communicatively coupled to the multi-channel light source 100. Proper thermal management may be critical for flash events due to their dynamic nature. In some embodiments the multivariate state estimator resides within a memory of the multi-channel light source 100, while in other embodiments the multivariate state estimator resides within a memory of an electronic device that is communicatively coupled to the multi-channel light source 100. As further described below, in some embodiments the multi-channel light source 100 resides within the electronic device, while in other embodiments the multi-channel light source is connected to the electronic device across a network. The multivariate state estimator may be configured to estimate the thermal state of the light source 100 based on thermal interactions of the ambient temperature and adjacent die.

An empirical solver module (also referred to as a "characterization module" or a "fast inverse solver") can also be configured to characterize light emitted by the light source 100. The characterization module can implement the processes (e.g., the inverse solver algorithm) described in U.S. application Ser. No. 15/425,467, which is incorporated by reference herein in its entirety. Thus, the characterization module may be configured to determine, based on a reference set of curves corresponding to different combinations of operating conditions (e.g., driving current and flux), an appropriate brightness and color point(s) necessary to achieve a particular color model corresponding to a particular CCT.

FIG. 1B depicts a side view of the multi-channel light source 100 illustrating how, in some embodiments, the illuminants 102 can reside within a housing. The housing can include a base plate 106 that surrounds the illuminants 102 and/or a protective surface 108 that covers the illuminants 102. While the protective surface 108 shown here is in the form of a dome, those skilled in the art will recognize that other designs are possible. For example, the protective surface 108 may instead be arranged in parallel relation to the substrate 104. Moreover, the protective surface 108 may be designed such that, when the multi-channel light source 100 is secured within an electronic device, the upper surface of the protective surface 108 is substantially co-planar with the exterior surface of the electronic device. The protective substrate 108 can be comprised of a material that is substantially transparent, such as glass, plastic, etc.

The substrate 104 can be comprised of any material able to suitably dissipate heat generated by the illuminants 102. A non-metal substrate, such as one comprised of woven fiberglass cloth with an epoxy resin binder (e.g., FR4), may be used to reduce/eliminate the problems associated with metal substrates. For example, a substrate 104 composed of FR4 can more efficiently dissipate the heat generated by multiple color channels without experiencing the heat retention issues typically encountered by metal substrates. Note, however, that some non-metal substrates can only be used in combination with mid-power illuminants (i.e., rather than high-power illuminants). High-power illuminants (e.g., those useful for producing flashes in the context of photography) may instead be mounted on a substrate 104 comprised of metal, ceramic, etc.

The processing components necessary for operating the illuminants 102 may be physically decoupled from the light source 100. For example, the processing components may be connected to the illuminants 102 via conductive wires running through the substrate 104. Examples of processing components include drivers 110, controllers 112 (e.g., processors), power sources 114 (e.g., batteries), etc. Consequently, the processing components need not be located within the light source 100. Instead, the processing components may be located elsewhere within the electronic device within which the light source 100 is installed. Additional information on the decoupling of processing components from a light source can be found in U.S. application Ser. No. 15/382,575, which is incorporated by reference herein in its entirety.

As noted above, the multi-channel light source 100 may be designed to operate in conjunction with an image sensor. Accordingly, the multi-channel light source 100 could be configured to generate a flash responsive to determining that an image sensor has received an instruction to capture an image of a scene. The instruction may be created responsive to receiving input indicative of user input requesting that the image be captured. As shown in FIG. 1C, an image sensor (here, a camera 152) may be housed within the same electronic device as a multi-channel light source. The user input may be in the form of tactile input provided along the surface of a touch-sensitive display or a mechanical button accessible along the exterior of the electronic device.

In some embodiments, the multi-channel light source is designed such that it can be readily installed within the housing of an electronic device. FIG. 1C depicts an electronic device 150 that includes a rear-facing camera 152 and a multi-channel light source 154 configured to illuminate the ambient environment. The multi-channel light source 154 may be, for example, the multi-channel light source 100 of FIGS. 1A-B. The rear-facing camera 152 is one example of an image sensor that may be configured to capture images in conjunction with light produced by the light source 100. Here, the electronic device 150 is a mobile phone. However, those skilled in the art will recognize that the technology described herein could be readily adapted for other types of electronic devices, such as tablet computers and digital cameras.

The camera 152 is typically one of multiple image sensors included in the electronic device 150. For example, the electronic device 100 may include a front-facing camera that allows an individual to capture still images or video while looking at the display. The rear-facing and front-facing cameras can be, and often are, different types of image sensors that are intended for different uses. For example, the image sensors may be capable of capturing images having different resolutions. As another example, the image sensors could be paired with different light sources (e.g., the rear-facing camera may be associated with a stronger flash than the front-facing camera, or the rear-facing camera may be disposed in proximity to a multi-channel light source while the front-facing camera is disposed in proximity to a single-channel light source).

Other components may also be disposed along the exterior of the housing 158 of the electronic device 150. For example, a microphone 156 can be configured to generate audio data when other actions are performed (e.g., an image is captured, a call is placed, etc.). The audio data may be used for noise cancellation purposes (e.g., to reduce ambient noise in video media generated by the camera 152).

FIG. 2 depicts an example of an array 200 of illuminants 202. If the illuminants 202 are LEDs, the array 200 may be produced using standard dies (also referred to as "chips"). A die is a small block of semiconducting material on which the diode located. Typically, diodes corresponding to a given color are produced in large batches on a single wafer (e.g., comprised of electronic-grade silicon, gallium arsenide, etc.), and the wafer is then cut ("diced") into many pieces, each of which includes a single diode. Each of these pieces may be referred to as a "die."

As shown in FIG. 2, the array 200 includes multiple color channels configured to produce light of different colors. Here, for example, the array 200 includes five color channels (i.e., blue, cyan, lime, amber, and red). Each color channel can include one or more illuminants. Here, for example, three color channels (i.e., blue, lime, and red) include multiple illuminants, while two color channels (i.e., cyan and amber) include a single illuminant. The number of illuminants in each color channel, as well as the arrangement of these illuminates within the array 200, may vary based on the desired output characteristics, such as maximum CCT, minimum CCT, maximum temperature, etc.

The array 200 is generally capable of producing light greater than 1,000 lumens, though some embodiments are designed to produce light less than 1,000 lumens (e.g., 700-800 lumens during a flash event). In some embodiments, the illuminants 202 are positioned in the array 200 in a highly symmetrical pattern to improve spatial color uniformity. For example, when the array 200 is designed to produce white light through simultaneous driving of the multiple color channels, the illuminants corresponding to those color channels may be arranged symmetrically to facilitate mixing of the colored light.

The array 200 may be designed such that it can be installed within the housing of an electronic device (e.g., electronic device 150 of FIG. 1C) in addition to, or instead of, a conventional flash component. For example, some arrays designed for installation within mobile phones are less than 4 mm in diameter, while other arrays designed for installation within mobile phones are less than 3 mm in diameter. The array 200 may also be less than 1 mm in height. In some embodiments, the total estimated area necessary for the array may be less than 3 $mm^2$ prior to installation and less than 6 $mm^2$ after installation. Such a design enables the array 200 to be positioned within a mobile phone without requiring significant repositioning of components within the mobile phone. One advantage of designing such a compact array of dies is that it can achieve good color mixing and adequate field of view (FOV) without the use of a collimator, diffuser, or lens.

In some embodiments, the array 200 is positioned within a collimator 204 (also referred to as a "mixing pipe") designed to ensure proper spatial color uniformity of light produced by the illuminants 202. The collimator 204 may also be designed to promote uniform color mixing and control the FOV of light emitted by the array 200. The collimator 204 can be comprised of an inflexible material (e.g., glass) or a flexible material (e.g., silicone). The collimator 204 may be in the form of a tubular body. In some embodiments the egress aperture of the tubular body is narrower than the array (e.g., the egress aperture may have a diameter of 2.5 mm, 3 mm, or 3.5 mm), while in other embodiments the egress aperture of the tubular body is wider than the array (e.g., the egress aperture may have a diameter of 4.5 mm, 5 mm, or 5.5 mm). Thus, the tubular body may have a sloped inner surface that either focuses or disperses light produced by the illuminants 202.

The array 200 may be used instead of, or in addition to, conventional flash technologies that are configured to generate a flash in conjunction with the capture of an image. Thus, an electronic device (e.g., electronic device 150 of FIG. 1C) may include a single-channel light source and/or a multi-channel light source.

Technologies for virtually binning illuminants, as well as using thermal/optical feedback mechanisms for tuning illuminants, have created an opportunity to use multi-channel, full-spectrum light sources to create the white light necessary for a flash event. Additional information on thermal/optical feedback mechanisms can be found in U.S. application Ser. No. 15/382,578, which is incorporated by reference herein in its entirety. Additional information on provisioning color mixing models can be found in U.S. application Ser. No. 15/609,619, which is incorporated by reference herein in its entirety.

Moreover, the improved geometries of illuminants (e.g., colored diodes) and dies on which these illuminants are located have permitted the assembly of light sources that include multiple color channels. Such advancements permit the construction of multi-channel, addressable arrays capable of fitting within the space presently allocated to the conventional flash component in electronic devices. Such a design can offer the possibility of professional-level output (also referred to as "stage-lighting-quality output") at over 1,000 lumens in an array having a diameter of approximately 3-4 mm. Moreover, such a design can offer the ability to provide broad-spectrum flashes while also providing the benefits of having individually addressable color channels in the gamut area.

In comparison to convention flash technologies, the multi-channel light sources described herein offer several benefits, including:

A true color match (i.e., $\Delta E$ of less than one) over a broad CCT range (e.g., from 1650K to over 10000K). $\Delta E$ (also referred to as the "color error" or the "unity error") is a measure of change in visual perception between two colors. $\Delta E$ values of less than one are not perceptible to the human eye.

Minimal Duv error (e.g., $\Delta uV < 0.002$).

A higher, flatter flux over the broad CCT range.

A higher flux-to-aperture ratio.

A lower peak power draw.

Access to a wider color gamut than other technologies.

FIG. 3A illustrates the tunable range of a two-channel light source in comparison to the Planckian locus (also referred to as the "black body locus"). The tunable range of two-channel light sources are typically narrow. For example, the tunable range of a two-channel light source will often be approximately 2500-5000K, though it may expand to 2700-6500K at its broadest. As shown in FIG. 3A, the light path between the two color channels is substantially linear. The largest Duv, meanwhile, is in the middle of the tunable range.

FIG. 3B illustrates the tunable range of a five-channel light source. The tunable range of the five-channel light source is much larger than the tunable range of the two-channel light source. Here, for example, the tunable range is approximately 1650-8000K, though it may be optimized to an even wider range for flash events. Rather than "walk" a linear path, the light path can instead walk along the Planckian locus to approximately 4500K and then follow the daylight locus to approximately 8000K. Consequently, the five-channel light source can more accurately reproduce both "warm" white lights having reddish hues (e.g., those intended to mimic candlelight, sunsets, etc.) and "cool" white lights having bluish hues (e.g., those intended to mimic blue sky, shade, etc.).

While embodiments may be described in the context of five-channel light sources, those skilled in the art will recognize that the technology is equally applicable to three-channel light sources, four-channel light sources, seven-channel light sources, etc. As the number of color channels increases, the ability of the light source to accurately produce a desired CCT will also generally increase. Thus, a seven-channel light source may be able to more accurately produce a given CCT than a five-channel light source or a three-channel light source, though the additional design complexities and illuminant cost may not necessarily be worthwhile. For example, because a five-channel light source can achieve a $\Delta E$ of less than one, additional color channels will often not be useful or noticeable. As the number of color channels increases, the total tunable range of the light source may also generally increase.

FIG. 4A illustrates the total achievable color gamut 404 of a five-channel light source in comparison to a conventional chromaticity diagram 402. The chromaticity diagram 402 characterizes colors by a luminance parameter and two color coordinates, which together specify a single point in the chromaticity diagram 402. Colors can precisely be compared using the chromaticity diagram 402 because each parameter is based on the spectral power distribution (SPD) of the light emitted from a light source and factored by sensitivity curves measured for the human eye.

In addition to white light of various CCTs, the five-channel light source can also be configured to produce colored light by separately driving/addressing each color channel. Assume, for example, that the five-channel light source includes five separate color channels configured to produce blue light, cyan light, lime light, amber light, and red light. To produce red light, a controller may cause current/voltage to be provided only to the red color channel. Similarly, to produce orange light, the controller may cause current/voltage to be provided to the red color channel and the amber color channel. Thus, the controller may be able to produce light in a variety of different colors (e.g., in accordance with a variety of color mixing models) in addition to white light at a variety of different CCTs.

FIG. 4B illustrates the visual impact of Duv on images captured in conjunction with flashes of white light produced by a two-channel light source and a five-channel light source. As noted above, Duv may be used to describe the distance from the Planckian locus when examining the chromaticity of white light.

For the two-channel light sources shown here, Duv is approximately 0.008 in the middle of the tuning range (though the actual value will depend on the CCTs of the two channels). For context, Duv values greater than approximately 0.002 are usually detectable. Phosphor-converted white light having low CRI will also typically result in desaturation. The tomatoes on the left and bottom of FIG. 4B were captured in conjunction with a two-channel light source. The tomato on the left has become visibly desaturated (also referred to as the "dullness" of an image), while the tomato on the bottom has become visibly discolored due to a hue shift.

For five-channel light sources, Duv will consistently be below 0.002. Five-channel light sources minimize Duv by traversing either the Planckian locus or the daylight locus across the entire tunable range. The tomato in the middle of FIG. 4B was captured in conjunction with a five-channel light source.

Because each channel of a five-channel light source can be separately driven (e.g., by a controller), various image characteristics can be modified in real time. For example, the five-channel light source may produce white light that increases saturation to produce more vibrant colors, as shown by the tomato on the right of FIG. 4B. As another example, the five-channel light source may produce white light that shifts hue, as shown by the tomatoes on the top and bottom of FIG. 4B. Thus, a five-channel light source can illuminate an ambient environment so that object(s) are imaged as they naturally appear to the human eye, as well as provide an option to intentionally produce discoloration (e.g., by altering saturation, hue, etc.).

A multi-channel light source can include, for example, five strategically selected, saturated color channels that synergistically overlap across the visible range.

When these color channels are combined, the multi-channel light source can exhibit several advantages including:
The ability to reproduce nearly all real white lights, both natural and artificial, to a level yielding near-zero color distortion (e.g., $\Delta E<1$) for an arbitrary multi-channel image sensor. Near-zero color distortion can be achieved for all real colors from grays to fully saturated colors. CCT, tint, spectral profile, and response profile of the multi-channel image sensor may all be integral to the illuminance spectrum.
The ability to produce significantly greater illumination per strobe aperture/die area than conventional multi-channel white light sources and monochromatic light sources due to greater die area utilization.
The ability to eliminate perceptible irreversible metamerisms introduced after standard chromatic adaptations of images captured in conjunction with light produced by state-of-the-art strobes with fully known spectra.
The ability to provide a universal strobe with relaxed color channel binning requirements compared to conventional white strobes. A "universal" strobe may be able to readily adapt to multi-channel image sensor response variations.

When these color channels are strobed in concert with a multi-channel image sensor (e.g., an RGB camera sensor), the multi-channel light source can exhibit several advantages including:
The ability to precisely reveal the universal visible-range spectral reflectivity profile of all illuminated surfaces on a per-pixel basis. Said another way, underlying surface reflectivity can be revealed rather than simply the apparent color (e.g., in an RGB sense).
Per-pixel reflectivity in turn enables:
Spectral identification of scene illuminant;
Identification of arbitrary multiple scene illuminants (e.g., an indoor source and an outdoor source via a window, scene-influenced illuminant tints, etc.);
Pixel-level illuminant spectrum identification;
True color of each pixel under any known illuminant, rather than just the apparent pixel color; and
Non-perceptible error chromatic adaptation for all colors.
Accordingly, the multi-channel light source also provides:
The ability to perfectly re-cast strobe-lit portions of a scene as if lit by native scene lighting spectra and relative intensities as the scene appears to the human eye. This results in "lifting" otherwise dark, noisy, or blurry images to be sufficiently lit, non-noisy, or non-blurry, yet have the appearance of no flash.
An accurate-to-human-perception color re-casting of arbitrary multi-illuminant scenes.
A controllable strobe able to provide image enhancement. As such, the multi-channel light source can be more ubiquitously employed than conventional flash technologies with inferior results.
Computer software (e.g., mobile application) utility. For example, an individual may be able to modify/monitor spectral reflective level (e.g., by matching the color of a painted surface, section of fabric, etc.) to match color across a broad color gamut, spectral assessments, image sensor response profiles, etc.

Image Sensor Overview

An image sensor is a sensor that detects information that constitutes an image. Generally, an image sensor does so by converting the variable attenuation of light waves (e.g., as they pass through or reflect off objects) into electrical signals, which represent small bursts of current that convey the information. Examples of image sensors include semiconductor-charge-coupled devices (CCDs) and complementary metal-oxide-semiconductor sensors (CMOS) sensors. Both types of image sensor accomplish the same task (i.e., capture light and convert it into electrical signals). However, because CMOS sensors are generally cheaper, smaller, and consume less power than CCDs, many electronic devices (e.g., mobile phones) use CMOS sensors for image capture.

Image sensors can also differ in their separation mechanism. One of the most common separation mechanisms is a filter array that passes light of different colors to selected pixel sensors. For example, each individual sensor element may be made sensitive to either red light, green light, or blue light by means of a color gel made of chemical dye. Because image sensors separate incoming light based on color, they may be said to have multiple sensor channels or multiple color channels. Thus, an image sensor that includes multiple sensor channels corresponding to different colors may be referred to as a "multi-channel image sensor."

FIG. 6 depicts an example of a separation mechanism 602 arranged over an image sensor 604. Here, the separation mechanism 602 is a Bayer filter array that includes three different types of color filters designed to separate incoming light into red light, green light, or blue light on a per-pixel basis. The image sensor 604, meanwhile, may be a CMOS sensor. Rather than use photochemical film to capture images, the electronic signal generated by the image sensor 604 is instead recorded to a memory for subsequent analysis.

After a recording function is initiated (e.g., responsive to receiving user input specifying that an image should be captured), a lens focuses light through an aperture, the separation mechanism 602, and onto the image sensor 604 itself. As shown in FIG. 6, the image sensor 604 may be arranged in a grid pattern of separate imaging elements (also referred to as "pixels"). Generally, the image sensor 604 determines the intensity of incoming light rather than the color of the incoming light. Instead, color is usually determined through the use of the separation mechanism 602 that only allows a single color of light into each pixel. For example, a Bayer filter array includes three different types of color filter that can be used to separate incoming light into three different colors (i.e., red, green, and blue), and then average these different colors within a two-by-two arrangement of pixels. Another method of color identification employs separate image sensors that are each dedicated to capturing part of the image (e.g., a single color), and the results can be combined to generate the full color image.

Characterization Module Overview

FIG. 7 depicts an example of a communication environment 700 that includes a characterization module 702 configured to determine an image feature based on two different types of data. The image feature may be reflectance, illuminance, or sensor response. In some embodiments, the image feature is determined on a per-pixel basis (e.g., in the case of reflectance).

The characterization module 702 can be configured to receive the two different types of data from different sources. Here, for example, the characterization module 702 receives first data 704 generated by a multi-channel image sensor 708 (e.g., the image sensor 604 of FIG. 6) and second data 706 generated by a multi-channel light source 710 (e.g., the light source 100 of FIG. 1A). The first data 704 can specify, on a per-pixel basis, an appropriate value for each sensor channel. For example, if the multi-channel image sensor 708 includes three sensor channels, then each pixel will be associated with at least three distinct values (e.g., a first value specifying a red value, a second value specifying a green value, and a third value specifying a blue value). The second data 706 can specify characteristics of each color channel of the multi-channel light source 710. For example, the second data 706 may specify the driving current for each color channel during a flash event, the dominant wavelength of each color channel, the illuminance profile of each color channel, etc.

In some embodiments, the multi-channel image sensor 708 and the multi-channel light source 710 are housed within the same electronic device (e.g., the electronic device 150 of FIG. 1C). In other embodiments, the multi-channel image sensor 708 and the multi-channel light source 710 reside within separate housings. For example, in the context of professional photography or videography, multiple multi-channel image sensors and multiple multi-channel light sources may be positioned in various arrangements to capture/illuminate different areas of a scene.

FIG. 8 illustrates a network environment 800 that includes a characterization module 802 (also referred to as a "solver module" or "fast inverse solver"). Individuals can interface with the characterization module 802 via an interface 804. The characterization module 802 may be responsible for analyzing data acquired from a multi-channel image sensor and a multi-channel image source to identify an image feature (e.g., reflectance, illuminance, or sensor response). The characterization module 802 may also be responsible for creating interfaces through which the individual can view results of the analysis, initiate post-processing operation(s), manage preferences, etc.

As noted above, the characterization module 802 may reside in a network environment 800. Thus, the characterization module 802 may be connected to one or more networks 806a-b. The networks 806a-b can include personal area networks (PANs), local area networks (LANs), wide area networks (WANs), metropolitan area networks (MANs), cellular networks, the Internet, etc. Additionally or alternatively, the characterization module 802 can be communicatively coupled to computing device(s) over a short-range communication protocol, such as Bluetooth® or Near Field Communication (NFC).

In some embodiments, the characterization module 802 resides on the same electronic device as the multi-channel image sensor and the multi-channel light source. For example, the characterization module 802 may be executed by a mobile application residing on a mobile phone. In other embodiments, the characterization module 802 is communicatively coupled to the multi-channel image sensor and/or the multi-channel light source across a network. For example, the characterization module 802 may be executed by a network-accessible platform (also referred to as a "cloud platform") residing on a computer server.

The interface 804 is preferably accessible via a web browser, desktop application, mobile application, or over-the-top (OTT) application. Accordingly, the interface 804 may be viewed on a personal computer, tablet computer, personal digital assistant (PDA), mobile phone, game console, music player, wearable electronic device (e.g., a watch or fitness accessory), network-connected ("smart") electronic device, (e.g., a television or home assistant device), virtual/augmented reality system (e.g., a head-mounted display), or some other electronic device.

Some embodiments of the characterization module 802 are hosted locally. That is, the characterization module 802 may reside on the same electronic device as the multi-channel image sensor or the multi-channel light source. For example, the characterization module 802 may be embodied as a mobile application executing on a mobile phone. Other embodiments of the characterization module 802 are executed by a cloud computing service operated by Amazon Web Services® (AWS), Google Cloud Platform™, Microsoft Azure®, or a similar technology. In such embodiments, the characterization module 802 may reside on a host computer server that is communicatively coupled to one or more content computer servers 808. The content computer server(s) 808 can include historical data (e.g., past data received from the multi-channel image sensor or the multi-channel light source), color mixing models, items necessary for post-processing such as heuristics and algorithms, and other assets. Such information could also be stored on the host computer server.

While some embodiments are described in the context of network-accessible interfaces, the interfaces need not necessarily be accessible via a network. For example, an electronic device (e.g., a laptop computer) may be configured to execute a self-contained computer program that does not require network access. Instead, the self-contained computer program may cause necessary assets (e.g., data from the multi-channel image sensor, data from the multi-channel light source, historical reflectance spectra, processing operations) to be downloaded at a single point in time or on a periodic basis (e.g., weekly, daily, or hourly).

Examination of Reflectance, Illuminance, and/or Sensor Response

Introduced here are computer programs and associated computer-implemented techniques for determining an image feature (also referred to as a "spectral property") based on multiple data inputs. The image feature may be reflectance, illuminance, or sensor response, each of which is separately described below. More specifically, any of these image features can be estimated based on the other two image features. Thus, reflectance can be calculated based on known values for illuminance and sensor response, illuminance can be calculated based on known values for reflectance and sensor response, and sensor response can be calculated based on known values for illuminance and reflectance.

A. Calculating Reflectance Based on Illuminance and Sensor Response

In some embodiments, a characterization module (e.g., the characterization module 702 of FIG. 7) is configured to calculate reflectance of an image on a per-pixel basis. By considering each pixel as its own illuminant, the characterization module can determine the reflectance profile of each pixel. These reflectance profiles enable pixels to be subsequently modified (e.g., during post-processing) on an individual basis. By comparison, electronic devices have conventionally attempted to estimate the color of light on a scene as a whole. Consequently, different illuminants (e.g., sunlight, fluorescent bulbs, LEDs) are all lumped into a single blended value. While post-processing will attempt to correct some color deficiencies, it will often be inadequate since these algorithms cannot account for multiple illuminants, nor can they account for the different types of illuminant.

The data required to calculate reflectance (i.e., illuminance and sensor response) can be acquired from a multi-channel light source (e.g., the light source 100 of FIG. 1A) and a multi-channel image sensor (e.g., the image sensor 604 of FIG. 6). However, the data can be acquired in several different ways. While the processes described below involve a five-channel light source, those skilled in the art will recognize the processes are equally applicable to multi-channel light sources having any number of channels.

FIG. 9 illustrates a process 900 for acquiring color information that may be useful in estimating reflectance on a pixel-by-pixel basis. A multi-channel light source can initially strobe through each color channel of the five color channels. More specifically, the light source can produce a series of discrete colored flashes by separately driving the illuminant(s) corresponding to a first color channel (step 901), a second color channel (step 902), a third color channel (step 903), a fourth color channel (step 904), and a fifth color channel (step 905). Such action will sequentially illuminate the scene with colored light of five different colors. For example, the scene may be flooded with blue light, cyan light, lime light, amber light, and red light in any order.

By pre-flashing each color channel, valuable information regarding the effect of flash contribution on image characteristics (e.g., pixel lightness, hue, and chromaticity) can be discovered. Each discrete flash can vary in length (also referred to as "duration"). Flashes produced in the context of photography are typically range from 15 milliseconds to 100 milliseconds. However, some flashes have sub-millisecond durations, while other flashes have multi-second durations. the technology described herein applied regardless of the flash duration. Moreover, each discrete flash may produce approximately 750-800 lumens (e.g., due to an application of 2-3 amps at 3 volts for 15 milliseconds).

A multi-channel image sensor may capture a series of images in conjunction with the series of colored flashes (step 906). More specifically, the multi-channel image sensor may capture at least one image under the colored flash produced by each color channel of the multi-channel light source. Following the steps 901-906, two different data sets will be available to a characterization module: first data generated by the multi-channel light source and second data generated by the multi-channel image sensor. The first data may include various illuminance characteristics (e.g., driving current, flux, operating temperature, wavelength), while the second data may include image data representing the sensor response of each sensor channel. The multi-channel image sensor may also capture a reference image without any flash (step 907).

Thereafter, the characterization module can examine the first data and the second data. More specifically, the characterization module can identify a spectral characteristic of each color channel of the multi-channel light source and each sensor channel of the multi-channel image sensor (step 1009). As further described below, the characterization module can then calculate reflectance on a per-pixel basis based on these spectral characteristics (step 1010).

FIG. 10 illustrates another process 1000 for acquiring color information that may be useful in estimating reflectance on a pixel-by-pixel basis. Rather than strobe through each color channel separately, the multi-channel light source can instead produce a series of discrete substantially white flashes by driving different combinations of color channels.

Here, for example, the light source can produce a series of discrete substantially white flashes by driving the illuminant(s) corresponding to all color channels except the first color channel (step 1001), the second color channel (step 1002), the third color channel (step 1003), the fourth color channel (step 1004), and the fifth color channel (step 1005). Such action will sequentially illuminate the scene with substantially white light, though the tint will differ slightly as each flash will be missing the illuminant(s) of a single color channel.

A multi-channel image sensor may capture a series of images in conjunction with the series of substantially white flashes (step 1006). More specifically, the multi-channel image sensor may capture at least one image under the substantially white flash produced without each color channel of the multi-channel light source. Following the steps 1001-1006, two different data sets will be available to the characterization module: first data generated by the multi-channel light source and second data generated by the image sensor. The first data may include various illuminance characteristics (e.g., driving current, flux, operating temperature, wavelength), while the second data may include image data representing response of the image sensor.

The multi-channel light source may also produce a reference flash by activating the illuminant(s) corresponding to all color channels (step 1007). In such embodiments, the multi-channel image sensor can capture a reference image in conjunction with the reference flash (step 1008). Such action enables a characterization module to readily determine the effect of each color channel without requiring that each color channel be separately addressed.

Thereafter, the characterization module can identify a spectral characteristic of each color channel of the multi-channel light source and each sensor channel of the multi-channel image sensor (step 1009), and then calculate reflectance on a per-pixel basis based on these spectral characteristics (step 1010). Steps 1009-1010 of FIG. 10 may be substantially identical to steps 908-909 of FIG. 9. In comparison to the series of colored flashes produced by process 900 of FIG. 9, the series of substantially white flashes produced by process 1000 of FIG. 10 may be less objectionable to the human eye.

Process 900 of FIG. 9 and process 1000 of FIG. 10 may require that the characterization module establish the effect of each color channel. In process 900, the characterization module may, for a given color channel, subtract image data associated with the reference image from image data associated with the corresponding image of the series of images. For example, if the characterization module would like to establish the effect of the lime color channel, the characterization module will subtract the reference image without flash from the image taken in conjunction with the lime-colored flash. In process 1000, the characterization may, for a given color channel, subtract image data associated with the image of the series of images in which the given color channel was not illuminated from the image data associated with the reference image. For example, if the characterization module would like to establish the effect of the lime color channel, the characterization module will subtract the image taken in conjunction with the substantially white flash that does not include lime-colored light from the reference image.

In some instances, an electronic device may employ "pre-image flashing" to establish the effect of each color channel of a multi-channel light source, and then capture an image without any flash. For example, this may be done for outdoor scenes in which a flash is unnecessary. Pre-image flashing may be formed additively (i.e., in accordance with process 900 of FIG. 9) or subtractively (i.e., in accordance with process 1000 of FIG. 10). In some embodiments, the "pre-image" captured in conjunction with each "pre-image flash" can be compiled into the final image. Thus, a separate image may not necessarily be captured following the series of images captured in conjunction with the pre-image flashes. These pre-images may also be shot at different shutter speeds, resolutions, etc., than the final image. For example, the electronic device may be configured to capture pre-images at a first resolution and an additional image at a second resolution. Generally, the first resolution will be lower than the second resolution since spectral information can be extracted regardless of whether the resolution is sufficient for photography purposes.

FIG. 11 illustrates an example plot of illuminance over the visible spectrum for a given color channel of a multi-channel light source. Illuminance represents the radiometric power (also referred to as the "energy") present on a per-wavelength basis. The x-axis corresponds to different wavelengths, and the y-axis corresponds to proportional radiometric power. The illuminance profile shown in FIG. 11 may also be referred to as the spectral power distribution ("SPD"). An SPD measurement describes the power per unit area per unit wavelength of an illumination. More generally, the SPD can visually represent the concentration, as a function of wavelength, of the radiometric power. While the SPD shown here includes normalized radiometric power values (i.e., scaled from 0-1), they could also be left in their original metric (i.e., power per unit area).

FIG. 12 illustrates an example plot of reflectance over the visible spectrum for a given pixel of an image. Reflectance represents the proportion of light energy reflected on a per-wavelength basis. The x-axis corresponds to different wavelengths, and the y-axis corresponds to proportional reflected energy. The reflectance profile shown in FIG. 12 enables the expected reflectance to be readily predicted at a variety of different wavelengths in the visible spectrum. For example, a point on the curve of (510, 0.55) means that at 510 nanometers (nm), an object with this reflectance profile will reflect approximately 55% of the light that hits it. Said another way, 45% of the light at 510 nm will be absorbed by the object.

FIG. 13 illustrates an example plot of the response of a given sensor channel of a multi-channel image sensor. The curve (also referred to as the "response profile") represents the proportional sensitivity of a single sensor channel on a per-wavelength basis. The x-axis corresponds to different wavelengths, and the y-axis corresponds to proportional sensitivity. The response profile enables sensitivity of the corresponding sensor channel to be readily predicted across the visible spectrum. For example, a point on the response curve of (510, 0.70) means that if one or more illuminants were measured with the given sensor channel and the illuminant(s) had equal energy across all wavelengths, then at 510 nm the given sensor channel will read approximately 70% of the value read at its peak sensitivity around 550 nm.

Unless otherwise specified, the term "multiply" will generally mean "element-wise multiplication." That is to say, for each wavelength, take the product of a value in a first curve with a corresponding value in a second curve and use the result as the answer. FIG. 14 illustrates how multiplying an illuminance profile (also referred to as an "illuminant SPD") by a reflectance profile may result in a new illuminance profile (also referred to as a "new illuminant SPD"). Such action represents a simulation of shining an illuminant corresponding to the illuminance profile on an object corresponding to the reflectance profile. The new illuminance profile, meanwhile, represents the light that is reflected off the object corresponding to the reflectance profile. Said another way, the new illuminance profile represents the light that was not absorbed by the object. The new illuminance profile is shown in bold.

As further described below, any two profile curves can be multiplied in this way, regardless of whether the profile curves relate to illuminance profiles, reflectance profiles, or response profiles. For example, in order to obtain an illuminance profile, a response profile can be divided by a reflectance profile.

After an illuminance profile has been shined on a reflectance to yield new illuminance profile (also referred to as a "reflected SPD"), each sensor channel of a multi-channel image sensor (e.g., a red channel, a green channel, and a blue channel) can be calculated by element-wise multiplying the new illuminance profile by the response profile to yield a sensor response, and then simply summing up the values in the sensor response. Such a process may also be called "integrating the sensor response."

In FIG. 15, for example, a response profile 1502 corresponding to a given sensor channel of a multi-channel image sensor is shown in bold. The response profile 1502 can be acquired by element-wise multiplying the illuminance profile 1504 and the reflectance profile 1506. The actual response of the corresponding sensor channel can then be estimated by summing the values in the response profile 1502. Here, for example, integrating the response profile 1502 results in a sensor channel value of approximately 12.6.

FIG. 16 depicts how, given response profiles 1602a-c for each sensor channel of a multi-channel image sensor and illuminance profiles 1604a-e for each color channel of a multi-channel light source, a reflectance profile 1606 can be created. Reflectance can then be determined on a per-pixel basis based on the reflectance profile 1606.

Here, the multi-channel image sensor includes three different sensor channels (e.g., a red channel, a green channel, and a blue channel), and each sensor channel is associated with a different response profile 1602a-c. The multi-channel light source includes five different color channels (e.g., a red channel, a blue channel, a cyan channel, a lime channel, and an amber channel), and each color channel is associated with a different illuminance profile 1604a-e.

Historically, measuring the reflectance of a surface (e.g., by generating a reflectance profile) has been costly and cumbersome. Therefore, reflectance was often only determined in scientific and industrial settings where such information was critically necessary to justify the cost. The technology described herein, however, can dramatically lower the cost of determining reflectance to the point that an electronic device (e.g., a mobile phone) having a multi-channel image sensor and a multi-channel light source can readily discover reflectance.

One example scenario illustrating the commercial value of being able to extrapolate reflectance from illuminance profiles and response profiles is re-lighting a scene during post-processing of still images or video. If an image is captured by a multi-channel image sensor in conjunction with light produced by a multi-channel light source, then reflectance can be calculated on a per-pixel basis. Moreover, because reflectance is known on a per-pixel basis, the image can later be processed to appear as though the light shown on the scene has changed. FIG. 17 illustrates a process 1700 for simulating the effect of a different light on a scene by altering an image during post-processing. Examples of commercial applications of processes similar to process 1700 are in the areas of machine vision, such as facial recognition, quality control, and inspections (i.e., where spectral properties, such as reflectance, are important).

The challenge of machine vision can largely be described as the ability of a machine (e.g., an electronic device, such as a mobile phone, tablet computer, etc.) to determine the nature of the objects in a captured scene, whether still images or video. Variations in illumination directly cause variations in captured images. The reflectance of an object is the true color of the object independent of any varying illumination. For instance, a typical image sensor cannot distinguish the difference between a blue object under white light and a white object under blue light. The nuances in true color, as represented by reflectance, within the portion of an image corresponding to an object can be used to gain confidence in distinguishing similar but different objects, such as a human baby and a baby doll. The capability of determining true reflectance can broadly improve the machine's ability to distinguish objects when the ambient lighting conditions vary.

Initially, a characterization module can acquire a reference image in which no light was produced by the multi-channel light source and a series of images in which each color channel of the multi-channel light source was separately flashed (step 1701). The characterization module may be, for example, the characterization module 702 of FIG. 7. The series of images, meanwhile, may be produced via process 900 of FIG. 9.

The characterization module can subtract, for each pixel, the sensor channel values associated with the reference image from each image of the series of images (step 1702). For example, if the multi-channel image sensor includes three sensor channels (e.g., a red channel, a green channel, and a blue channel), then each pixel in the reference image and each image in the series of images will include three values. As further described below, the characterization module can then calculate reflectance for the scene on a per-pixel basis (step 1703).

Thereafter, the characterization module can receive input indicative of a selection of an arbitrary new illuminant corresponding to a new illuminance profile (step 1704). For example, an individual may choose to simulate re-imaging of the scene under another white light corresponding to a different CCT. The characterization module can then create a modified image by multiplying the new illuminance profile by the calculated reflectance on a per-pixel basis (step 1705). Such action simulates how the scene would appear under the new illuminant. Thus, the resulting pixel values (e.g., a red value, a green value, and a blue value) of the modified image will be as if the original image (i.e., the reference image) was taken under the new illuminant. The characterization module may also store the modified image in a memory (step 1706).

Other steps may also be performed. For example, the characterization module may cause the modified image to be shown on an interface (e.g., for review by the individual), subjected to another post-processing operation (e.g., filtering, contrast variation, color modulation), etc.

FIG. 18 illustrates a process 1800 for estimating the reflectance of an object based on a series of fingerprints. To estimate reflectance, multiple images may be captured by a multi-channel image sensor in conjunction with a series of flashes produced by a multi-channel light source. As described above with respect to FIG. 9, the multi-channel image sensor may capture as many images as there are color channels in the multi-channel light source. For example, if the multi-channel light source includes five color channels, then the multi-channel image sensor may produce five images, one for each color channel.

Thus, the multi-channel light source will initially flash each color channel on a training set of reflectances (step 1801), and the multi-channel image sensor will capture an image in conjunction with each flash (step 1802).

Thereafter, a characterization module can calculate a fingerprint for each pixel of each image in the series of images (step 1803). Thus, each pixel in each of these images will have a "fingerprint," which represents the integrated image sensor output across the other known color channels. For example, if the multi-channel light source includes five color channels and the multi-channel image sensor includes three sensor channels, then each fingerprint will have fifteen total elements. These elements can be written as:

$$F_{Light\_Source\_Channel, Image\_Sensor\_Channel} = (F_{1,1}, F_{1,2}, F_{1,3}, F_{2,1}, F_{2,2}, \ldots F_{5,3}),$$

where $F_{3,2}$, for example, corresponds to the output by the second sensor channel of the multi-channel image sensor when illuminated by the third color channel of the multi-channel light source. Knowing that there are fifteen total elements, the fingerprint can be represented in a simplified manner as:

$$F=(F_1, F_2, F_3, F_4, \ldots F_{15}).$$

Each pixel in the multi-channel image sensor can also be associated with a "fingerprint" based on the list of past images captured (e.g., one image for each color channel of the multi-channel light source). Note that the term "fingerprint" will be redefined for each calculation described herein (e.g., when determining reflectance, illuminance, and sensor response).

A characterization module can then set up linear regression using training fingerprints and training reflectances (step 1804). As further described below, much like training illuminants and training image sensors, these training reflectances can be generated algorithmically. Such action enables the characterization module to establish the relationship between fingerprints and reflectances so that reflectance can subsequently be estimated based on a given fingerprint. The characterization module can also perform multiple linear regression for each wavelength (e.g., in the visible spectrum) to form a reflectance characterization matrix (step 1805). The characterization module can apply the reflectance characterization matrix to the measured fingerprints to predict a reflectance profile of the imaged object (step 1806).

FIG. 19 illustrates how, given an illuminance profile for each color channel of a multi-channel light source and a response profile for each sensor channel of a multi-channel image sensor, the reflectance of an object being imaged can be extrapolated by a characterization module. In fact, because each pixel of an image sensor can be considered to be multiple independent image sensors (i.e., an independent image sensor for each color channel), the characterization module can yield a complete reflectance profile for each pixel.

The true reflectance (i.e., the reflectance under ideal light) of an object being photographed by a multi-channel image sensor will typically not be known. However, the characterization module will have access to the output generated by the multi-channel image sensor (e.g., the red value, the green value, and the blue value of each pixel) and the output generated by the multi-channel light source (e.g., the spectral properties of each color channel).

Assume, for example, that the reflectance of an object being photographed is not known. To generate the (reflectance) fingerprint, a series of images may be captured by the multi-channel image sensor, where each image is taken in conjunction with a flash produced by a different color channel of the multi-channel light source. More specifically, a characterization module can perform a process as follows:

Step 1: Simulate the multi-channel light source being shined on the object by multiplying the appropriate illuminance profile(s) and the reflectance profile.

Step 2: Acquire the image sensor response by multiplying the response curve by the result of Step 1.

Step 3: Calculate the (reflectance) fingerprint by integrating the result of Step 2.

Steps 1-3 are performed for each color channel of the multi-channel light source and each sensor channel of the multi-channel image sensor. Thus, if the multi-channel light source includes five color channels and the multi-channel image sensor includes three sensor channels, the fingerprint for a given pixel will include fifteen elements (i.e., $F_1$, $F_2$, $F_3$, $F_4$, ... $F_{15}$).

The reflectance profile can then be calculated on a per-nanometer basis using the fingerprint. More specifically, the characterization module can take the dot product of the fingerprint and a wavelength-specific vector of fifteen coefficients (i.e., $A_1$, $A_2$, $A_3$, $A_4$, ... $A_{15}$) as follows:

$$R = A_1 * F_1 + A_2 * F_2 + A_3 * F_3 + \ldots A_{15} * F_{15},$$

where the sum (i.e., R) represents the value of the reflectance profile at the corresponding wavelength.

The sum can be computed for each nanometer using distinct sets of coefficients. A reflectance characterization matrix populated with these distinct sets of coefficients can be represented as follows:

$$\begin{array}{cccc} A_1(400 \text{ nm}) & A_2(400 \text{ nm}) & \ldots & A_{15}(400 \text{ nm}) \\ A_1(401 \text{ nm}) & A_2(401 \text{ nm}) & \ldots & A_{15}(401 \text{ nm}) \\ A_1(402 \text{ nm}) & A_2(402 \text{ nm}) & \ldots & A_{15}(402 \text{ nm}) \\ & \ldots & & \\ A_1(700 \text{ nm}) & A_2(700 \text{ nm}) & \ldots & A_{15}(700 \text{ nm}) \end{array}$$

After the reflectance characterization matrix has been fully calculated, it can be used to efficiently determine the complete reflectance profile in the future by simply taking the dot product of the appropriate row and the fingerprint to estimate reflectance at each wavelength.

To acquire each row in the reflectance characterization matrix, the characterization module may use ordinary least squares linear regression on a training set of equations having known answers. These equations can be generated by producing fingerprints for a number of reflectance profiles that are accessible to the algorithm(s) executed by the characterization module. These reflectance profiles are associated with the "training reflectances."

The exact nature of the training reflectances is described below. For now, assume that for each training reflectance in the training set, the characterization module can generate a fingerprint. Moreover, because the characterization module knows the actual reflectance, it also knows the reflectance value at each nanometer. Therefore, the characterization module can generate as many equations as there are training reflectances on a per-nanometer basis. Here, for example, 100 equations were produced for 400 nm:

$$Y_1 = A_1(400 \text{ nm})^* F_{1,1} + A_2(400 \text{ nm})^* F_{2,1} + \ldots A_{15}(400 \text{ nm})^* F_{15,1}$$

$$Y_2 = A_1(400 \text{ nm})^* F_{1,2} + A_2(400 \text{ nm})^* F_{2,2} + \ldots A_{15}(400 \text{ nm})^* F_{15,2}$$

$$Y_3 = A_1(400 \text{ nm})^* F_{1,3} + A_2(400 \text{ nm})^* F_{2,3} + \ldots A_{15}(400 \text{ nm})^* F_{15,3}$$

$$\ldots$$

$$Y_{100} = A_1(400 \text{ nm})^* F_{1,100} + A_2(400 \text{ nm})^* F_{2,100} + \ldots A_{15}(400 \text{ nm})^* F_{15,100}$$

While the embodiment described here includes 100 equations, those skilled in the art will recognize that any number of equations could be produced. These equations can be generated for each nanometer in a desired spectrum (e.g., 10 nm-400 nm, 400-700 nm, 700 nm-1 mm). While some embodiments of the characterization module are designed for the visible spectrum, other embodiments of the characterization module can perform similar processes in the ultraviolet range, infrared range, etc. The "Y" values (i.e., $Y_1, Y_2, Y_3, \ldots Y_{100}$) are the known reflectance values at 400 nm for each training reflectance.

Moreover, the characterization module can perform ordinary least squares regression on these equations to determine the coefficient values (i.e., $A_1, A_2, \ldots A_{15}$) at 400 nm. After these coefficient values are yielded from the regression, the characterization module can predict the reflectance at 400 nm of an arbitrary object knowing only the fingerprint, which can be derived from the pixel values (e.g., the red values, the green values, and the blue values) of an image generated by a multi-channel image sensor.

After performing the regression operation for each nanometer within the desired spectrum, the characterization module will have the reflectance characterization matrix described above. The characterization module can then calculate the reflectance of an imaged object, at each wavelength, by taking the dot product of the wavelength-appropriate row in the reflectance characterization matrix and the fingerprint derived from the image.

B. Calculating Illuminance Based on Reflectance and Sensor Response

FIG. 20 depicts how, given response profiles for each sensor channel of a multi-channel image sensor and reflectance profiles for various imaged objects, an illuminance profile can be created.

Historically, measuring the illuminance via illuminance profiles (also referred to as "SPDs") has been costly. For example, spectrometers configured to measure illuminance at a single-nanometer resolution often cost several thousand dollars, while those configured to measure illuminance at resolutions of fifteen nanometers or worse still cost several hundred dollars. Conversely, the technology described herein can extrapolate illuminance profiles using commodity illuminants (e.g., LEDs) and a commodity image sensor, spectrometers having single-nanometer resolution can be constructed at much lower cost.

FIG. 21 illustrates an example of a spectrometer 2100 that makes use of the technology described herein. As shown in FIG. 21, light 2102 initially enters the spectrometer 2100 through a diffuse opening 2104 (also referred to as an "aperture") in the housing. Inside the spectrometer 2100, the light 2102 can reflect off a color grid of known reflectances 2106 toward a multi-channel image sensor 2104 having a fixed lens. The multi-channel image sensor 2104 may be, for example, a commodity image sensor configured to generate, for each pixel, a red value, a green value, and a blue value. Such an image sensor may be referred to as an "RGB image sensor" or an "RGB camera sensor." Using only commodity components and the technology described herein, a detailed, high-resolution illuminance profile of the light 2102 entering the diffuse opening 2104 can be extrapolated using the process detailed below.

FIG. 22 illustrates a process 2200 for estimating the illuminance based on a series of fingerprints. Initially, reference reflectances are illuminated by producing a series of flashes by illuminating a series of training illuminants (step 2201). The reference reflectances may be, for example, multiple color samples selected from amongst the 99 color evaluation samples (CES) in TM-30-15. In some embodiments the series of training illuminants correspond to different light sources, while in other embodiments the series of training illuminants are created by a multi-channel light source (e.g., the multi-channel light source 100 of FIG. 1A) capable of producing light of different CCTs. A multi-channel image sensor can be configured to capture an image in conjunction with each flash (step 2202).

Thereafter, a characterization module can calculate a fingerprint for each training illuminant (step 2203). Thus, each training illuminant shined on the reference reflectances will have a "fingerprint." The characterization module may also set up linear regression using training fingerprints and training illuminants (step 2204). Such action enables the characterization module to establish the relationship between fingerprints and illuminants so that illuminance can subsequently be estimated based on a given fingerprint. The characterization module can also perform multiple linear regression for each wavelength (e.g., in the visible spectrum) to form an illuminance characterization matrix (step 2205). The characterization module can apply the illuminance characterization matric to a measured fingerprint to predict an illuminance profile of light reflected off the reference reflectances (step 2206).

FIG. 23 illustrates how, given a reflectance profile for each of multiple reference reflectances and a response profile for each sensor channel of a multi-channel image sensor, the illuminance profile of light emitted by an illuminant can be extrapolated by a characterization module. In contrast to extrapolating reflectance, the characterization module can calculate illuminance for a single illuminant shining on reference reflectances. Extrapolation is not performed on a per-pixel basis.

The true illuminance shined on a scene will typically not be known. However, the characterization module will have access to the output generated by the multi-channel image sensor (e.g., the red value, the green value, and the blue value of each pixel) and the actual reflectance of each reference reflectance.

Assume, for example, that the illuminance produced by an illuminant is not known. To generate the (illuminance) fingerprint, an image may be captured by the multi-channel image sensor, where the image includes image sensor values for each reference reflectance (e.g., a red value, a green value, and a blue value). More specifically, a characterization module can perform a process as follows:

Step 1: Simulate the training illuminant being shined on a reference reflectance by multiplying the appropriate illuminance profile(s) and the reflectance profile.

Step 2: Acquire the image sensor response by multiplying the response curve by the result of Step 1.

Step 3: Calculate the (illuminance) fingerprint by integrating the result of Step 2.

Steps 1-3 are performed for each reference reflectance and each sensor channel of the multi-channel image sensor. Thus, if the reference reflectances include all 99 color evaluation samples (CES) in TM-30-15 and the multi-channel image sensor includes 3 sensor channels, the fingerprint for each training illuminant will include 297 elements (i.e., $F_1, F_2, F_3, F_4, \ldots F_{297}$).

The illuminance profile can then be calculated on a per-nanometer basis using the fingerprint. More specifically, the characterization module can take the dot product of the fingerprint and a wavelength-specific vector of 297 coefficients (i.e., (i.e., $A_1, A_2, A_3, A_4, \ldots A_{297}$) as follows:

$$I = A_1 {}^*F_1 + A_2 {}^*F_2 + A_3 {}^*F_3 + \ldots A_{297} {}^*F_{297},$$

where the sum (i.e., I) represents the value of the illuminance profile at the corresponding wavelength.

The sum can be computed for each nanometer using distinct sets of coefficients. An illuminance characterization matrix populated with these distinct sets of coefficients can be represented as follows:

$$A_1(400 \text{ nm}) \quad A_2(400 \text{ nm}) \quad \ldots \quad A_{297}(400 \text{ nm})$$

$$A_1(401 \text{ nm}) \quad A_2(401 \text{ nm}) \quad \ldots \quad A_{297}(401 \text{ nm})$$

$$A_1(402 \text{ nm}) \quad A_2(402 \text{ nm}) \quad \ldots \quad A_{297}(402 \text{ nm})$$

$$\ldots$$

$$A_1(700 \text{ nm}) \quad A_2(700 \text{ nm}) \quad \ldots \quad A_{297}(700 \text{ nm})$$

After the illuminance characterization matrix has been fully calculated, it can be used to efficiently determine the complete illuminance profile in the future by simply taking the dot product of the appropriate row and the fingerprint to estimate illuminance at each wavelength.

To acquire each row in the illuminance characterization matrix, the characterization matrix may use ordinary least squares linear regression on a training set of equations having known answers. These equations can be generated by producing fingerprints for a number of mathematically generated illuminance profiles that are accessible to the algorithm(s) executed by the characterization module. These illuminance profiles are associated with the "training illuminants."

The exact nature of the training illuminants is described below. For now, assume that for each training illuminant in the training set, the characterization module can generate a fingerprint. Moreover, because the characterization module knows the actual reflectance, it also knows the illuminance value at each nanometer. Therefore, the characterization module can generate as many equations as there are training illuminants on a per-nanometer bases. Here, for example, 100 equations were produced for 400 nm:

$$Y_1 = A_1(400 \text{ nm})^* F_{1,1} + A_2(400 \text{ nm})^* F_{2,1} + \ldots A_{297}(400 \text{ nm})^* F_{297,1}$$

$$Y_2 = A_1(400 \text{ nm})^* F_{1,2} + A_2(400 \text{ nm})^* F_{2,2} + \ldots A_{297}(400 \text{ nm})^* F_{297,2}$$

$$Y_3 = A_1(400 \text{ nm})^* F_{1,3} + A_2(400 \text{ nm})^* F_{2,3} + \ldots A_{297}(400 \text{ nm})^* F_{297,3}$$

$$\ldots$$

$$Y_{100} = A_1(400 \text{ nm})^* F_{1,100} + A_2(400 \text{ nm})^* F_{2,100} + \ldots A_{297}(400 \text{ nm})^* F_{297,100}$$

While the embodiment described here includes 100 equations, those skilled in the art will recognize that any number of equations could be produced. These equations can be generated for each nanometer in a desired spectrum (e.g., 10 nm-400 nm, 400-700 nm, 700 nm-1 mm). While some embodiments of the characterization module are designed for the visible spectrum, other embodiments of the characterization module can perform similar processes in the ultraviolet range, infrared range, etc. The "Y" values (i.e., $Y_1, Y_2, Y_3, \ldots Y_{100}$) are the known illuminance values at 400 nm for each training illuminant.

Moreover, the characterization module can perform ordinary least squares regression on these equations to determine the coefficient values (i.e., $A_1, A_2, \ldots A_{297}$) at 400 nm. After these coefficient values are yielded from the regression, the characterization module can predict the illuminance at 400 nm of light produced by an arbitrary illuminant knowing only the fingerprint, which can be derived from the pixel values (e.g., the red values, the green values, and the blue values) of an image including several known reflectances.

After performing the regression operation for each nanometer within the desired spectrum, the characterization module will have the illuminance characterization matrix described above. The characterization module can then calculate the illuminance value of light produced by an arbitrary illuminant, at each wavelength, by taking the dot product of the wavelength-appropriate row in the illuminance characterization matrix and the fingerprint derived from the image.

C. Calculating Sensor Response Based on Reflectance and Illuminance

FIG. 24 illustrates a process 2400 for estimating the response of a multi-channel image sensor based on a series of fingerprints. Initially, reference reflectances are illuminated by producing a series of flashes with a series of known illuminants (step 2401). The reference reflectances may be, for example, multiple color samples selected from amongst the 99 color evaluation samples (CES) in TM-30-15. In some embodiments the series of known illuminants correspond to different light sources, while in other embodiments the series of known illuminants are created by a multi-channel light source (e.g., the multi-channel light source 100 of FIG. 1A) capable of producing light of different CCTs. A multi-channel image sensor can be configured to capture an image in conjunction with each flash (step 2402).

Thereafter, a characterization module can calculate a fingerprint for each training image sensor (step 2403). Thus, each training image sensor configured to capture an image of the light shined on the reference reflectances by the known illuminant(s) will have a "fingerprint." The characterization module may also set up linear regression using training fingerprints and training image sensors (step 2404). Such action enables the characterization module to establish the relationship between fingerprints and image sensors so that sensor response can subsequently be estimated based on a given fingerprint. The characterization module can also perform multiple linear regression for each wavelength (e.g., in the visible spectrum) to form a sensor response characterization matrix (step 2405). The characterization module can apply the sensor response characterization matric to a measured fingerprint to predict a response profile of an arbitrary image sensor (step 2406).

Historically, measuring the response of an image sensor (e.g., by generating a response profile) has been costly. Normally, a monochromator is used in conjunction with an integrating sphere and a spectrometer to correlate known, narrow-band irradiances with response of an image sensor (e.g., for a red channel, a green channel, and a blue channel). The technology described herein, however, can readily estimate the sensor response using, for example, the 99 CES in TM-30-15 and a multi-channel light source with multiple color channels, each of which is associated with a known illuminance profile.

FIG. 25 illustrates a process 2500 for extrapolating the response profile for a multi-channel image sensor. Initially, a characterization can acquire a reference image in which no light was produced by a multi-channel light source and a series of images in which each color channel of the multi-channel light source was separately flashes (step 2501). The characterization module may be, for example, the characterization module 702 of FIG. 7. The series of images, meanwhile, may be produced via process 900 of FIG. 9.

The characterization module can subtract, for each pixel, the sensor channel values associated with the reference image from each image of the series of images (step 2502). For example, if the multi-channel image sensor includes three sensor channels (e.g., a red channel, a green channel, and a blue channel), then each pixel in the reference image and each image in the series of images will include three values. As further described below, the characterization module can then determine the response of each sensor channel of the multi-channel image sensor (step 1703).

FIG. 26 illustrates how, given a reflectance profile for each of multiple reference reflectances and an illuminance profile for each of multiple reference illuminants, a response profile can be created. Assume, for example, that the response profile of a sensor channel of a multi-channel image sensor is not known. To generate the (response) fingerprint, a series of images may be images may be captured by training image sensors, where each image is taken of each reference reflectance in conjunction with each reference illuminant. More specifically, a characterization module can perform a process as follows:

Step 1: Simulate the reference illuminant being shined on a reference reflectance by multiplying the appropriate illuminance profile and the reflectance profile.

Step 2: Acquire the response of the training image sensor by multiplying the response profile by the result of Step 1.

Step 3: Calculate the (response) fingerprint by integrating the result of Step 2.

Steps 1-3 are performed for each reference reflectance and each reference illuminant. Thus, if the reference reflectances include 15 CES in TM-30-15 and the multi-channel light source includes 5 color channels, the fingerprint for each training image sensor will include 75 elements (i.e., $F_1$, $F_2$, $F_3$, $F_4$, ... $F_{75}$).

The response profile can then be calculated on a per-nanometer basis using the fingerprint. More specifically, the characterization module can take the dot product of the fingerprint and a wavelength-specific vector of 75 coefficients (i.e., $A_1$, $A_2$, $A_3$, $A_4$, ... $A_{75}$) as follows:

$$SR = A_1 {}^*F_1 + A_2 {}^*F_2 + A_3 {}^*F_3 + \ldots A_{75}{}^*F_{75},$$

where the sum (i.e., SR) represents the value of the response profile at the corresponding wavelength.

The sum can be computed for each nanometer using distinct sets of coefficients. A response characterization matrix populated with these distinct sets of coefficients can be represented as follows:

$$\begin{array}{llll} A_1(400 \text{ nm}) & A_2(400 \text{ nm}) & \ldots & A_{75}(400 \text{ nm}) \\ A_1(401 \text{ nm}) & A_2(401 \text{ nm}) & \ldots & A_{75}(401 \text{ nm}) \\ A_1(402 \text{ nm}) & A_2(402 \text{ nm}) & \ldots & A_{75}(402 \text{ nm}) \\ & & \ldots & \\ A_1(700 \text{ nm}) & A_2(700 \text{ nm}) & \ldots & A_{75}(700 \text{ nm}) \end{array}$$

After the response characterization matrix has been fully calculated, it can be used to efficiently determine the complete response profile in the future by simply taking the dot product of the appropriate row and the fingerprint to estimate response at each wavelength.

To acquire each row in the response characterization matrix, the characterization module may use ordinary least squares linear regression on a training set of equations having known answers. These equations can be generated by producing fingerprints for a number of response profiles that are accessible to the algorithm(s) executed by the characterization module. These response profiles are associated with the "training image sensors."

For each training image sensor, the characterization module can generate a fingerprint. Moreover, because the characterization module knows the actual response profile of each training image sensor, it knows the value at each nanometer along the response profile. Therefore, the characterization module can generate as many equations as there are training image sensors on a per-nanometer basis. Here, for example, 100 equations were produced for 400 nm:

$$Y_1 = A_1(400 \text{ nm})^* F_{1,1} + A_2(400 \text{ nm})^* F_{2,1} + \ldots A_{75}(400 \text{ nm})^* F_{75,1}$$

$$Y_2 = A_1(400 \text{ nm})^* F_{1,2} + A_2(400 \text{ nm})^* F_{2,2} + \ldots A_{75}(400 \text{ nm})^* F_{75,2}$$

$$Y_3 = A_1(400 \text{ nm})^* F_{1,3} + A_2(400 \text{ nm})^* F_{2,3} + \ldots A_{75}(400 \text{ nm})^* F_{75,3}$$

$$\ldots$$

$$Y_{100} = A_1(400 \text{ nm})^* F_{1,100} + A_2(400 \text{ nm})^* F_{2,100} + \ldots A_{75}(400 \text{ nm})^* F_{75,100}$$

While the embodiment described here includes 100 equations, those skilled in the art will recognize that any number of equations could be produced. These equations can be generated for each nanometer in a desired spectrum (e.g., 10 nm-400 nm, 400-700 nm, 700 nm-1 mm). While some embodiments of the characterization module are designed for the visible spectrum, other embodiments of the characterization module can perform similar processes in the ultraviolet range, infrared range, etc. The "Y" values (i.e., $Y_1, Y_2, Y_3, \ldots Y_{100}$) are the known response values at 400 nm for each training image sensor.

Moreover, the characterization module can perform ordinary least squares regression on these equations to determine the coefficient values (i.e., $A_1, A_2, \ldots A_{75}$) at 400 nm. After these coefficient values are yielded from the regression, the characterization module can predict the response at 400 nm of an arbitrary image sensor knowing only the fingerprint, which can be derived from the pixel values (e.g., the red values, the green values, and the blue values) of an image generated by a multi-channel image sensor.

After performing the regression operation for each nanometer within the desired spectrum, the characterization module will have the response characterization matrix described above. The characterization module can then calculate the response of an image sensor, at each wavelength, by taking the dot product of the wavelength-appropriate row in the response characterization matrix and the fingerprint derived from the image.

"Subtractive" Usage of Illuminance Profiles

For clarity, many of the examples involving multiple illuminants (e.g., the multiple color channels of a multi-channel LED array) required that each illuminant be independently driven to generate a component image. However, in a practical application, a user of a multi-channel image sensor and a multi-channel light source may find it objectionable to see several saturated colors flashed independently in quick succession.

"Subtractive flashing" refers to the idea of using a multi-channel light source such that all color channels are on except a first color channel, all color channels are on except a second color channel, etc. Additional information on subtractive flashing is included above with respect to FIG. 10. By using the subtractive method, identical results can be achieved without flashing saturated colors. Instead, a series of substantially white flashes can be produced by the multi-channel light source.

FIG. 27A illustrates how illuminance of each color channel of a multi-channel light source can be determined by independently driving each color channel. FIG. 27B, meanwhile, illustrates how illuminance of each color channel of a multi-channel light source can be determined via subtractive flashing (also referred to as the "all-on-and-one-off method"). The predicted reflectance is identical regardless of technique, as shown by the bolded line.

Training Sets

In each of the three cases described above, the unknown variable is substituted with a list of mathematically generated curves in order to train the corresponding characterization matrix. FIG. 28A illustrates a single member of a training set, while FIG. 28B illustrates of an entire training set that includes a series of individual members that sweep across the domain of interest. The training members can take various forms. Here, for example, the training member is in the form of a triangle. The training profiles in general need to exhibit variation in wavelength and amplitude, to allow the linear regression to find a solution that covers the desired spectrum. The exact nature of the training profiles used in our implementation is described below. However, other forms may also be used. For instance, a set of Gaussian-distributed curves that more closely mimic real narrow-band illuminants may be used as the training set.

In practice, a series of training members are typically distributed across the domain of interest. For example, 100 training curves may be used at 3 nanometer intervals to cover the entire visible range (e.g., 400-700 nm). As another example, 300 training curves may be used at 1 nanometer intervals to cover the entire visible range. As another example, 60 training curves may be used at 5 nanometer intervals to cover the entire visible range. Those skilled in the art will recognize that the spacing of the training curves (and thus the number of training curves) in a set may vary based on desired resolution, available memory, etc.

Illustrative Example

As noted above, techniques for determining reflectance can be used in a variety of spectrometry implementations. An illustrative example was provided above in which a low-cost spectrometer includes a commodity RGB image sensor and a color grid of known reflectances. However, if an individual takes a picture in which an object in the scene has sufficient reflectance variability among its pixels, then a characterization module can initially determine reflectance on a per-pixel basis (e.g., via the process 1900 of FIG. 19), and then use the now-known reflectances to take the place of the color grid in the previously described spectrometer implementation.

Accordingly, any electronic device connected to a multi-channel image sensor and a multi-channel light source can act as a spectrometer by itself, without holding a color grid of known reflectances. The electronic device may be, for example, a mobile phone, tablet computer, etc. While the precise relationship between the reflectance distribution among pixels in the scene and the accuracy of the resulting illuminance profile (also referred to as the "spectral power distribution" or "SPD") may not be known, highly accurate illuminance profiles can be readily produced using less than 10-15 known reflectances (e.g., from the TM-30-15 (i.e., rather than the entire set of 99 known reflectances).

In practice, an individual could capture an image of a business card-sized paper card with a color grid of known reflectances (e.g., 10 CES, 12 CES, 15 CES, etc.) with a mobile phone in conjunction with a flash produced by a multi-channel light source. In this case, a characterization module residing on the mobile phone can determine the reflectance of each element of the color grid using the above-mentioned technique for determining reflectance based on known illuminants and known image sensors. Such a technique may work with acceptable accuracy even if the color grid was not measured/calibrated because the reflectances can be estimated in real time (i.e., "on the fly"). Thus, the technology may permit an electronic device to act as a spectrometer so long as a scene having enough different reflectances in it can be captured, even if those reflectances are not fully measured beforehand.

Processing System

FIG. 29 is a block diagram illustrating an example of a processing system 2900 in which at least some operations described herein can be implemented. For example, some components of the processing system 2900 may be hosted on an electronic device that includes a multi-channel light source (e.g., light source 100 of FIGS. 1A-B) or on an electronic device that is communicatively connected to a multi-channel light source (e.g., via a cable connection or a wireless connection).

The processing system 2900 may include one or more central processing units ("processors") 2902, main memory 2906, non-volatile memory 2910, network adapter 2912 (e.g., network interface), video display 2918, input/output devices 2920, control device 2922 (e.g., keyboard and pointing devices), drive unit 2924 including a storage medium 2926, and signal generation device 2930 that are communicatively connected to a bus 2916. The bus 2916 is illustrated as an abstraction that represents one or more physical buses and/or point-to-point connections that are connected by appropriate bridges, adapters, or controllers. The bus 2916, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 2900 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 2900.

While the main memory 2906, non-volatile memory 2910, and storage medium 2926 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 2928. The term "machine-readable medium" and "storage medium" shall also be taken to include any medium that is capable of storing, encoding, or carrying a set of instructions for execution by the processing system 2900.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 2904, 2908, 2928) set at various times in various memory and storage devices in a computing device. When read and executed by the one or more processors 2902, the instruction(s) cause the processing system 2900 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 2910, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 2912 enables the processing system 2900 to mediate data in a network 2914 with an entity that is external to the processing system 2900 through any communication protocol supported by the processing system 2900 and the external entity. The network adapter 2912 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 2912 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for creating a reflectance characterization matrix, the method comprising:
    illuminating training reflectances by producing a series of colored flashes by sequentially illuminating each color channel of a multi-channel light source;
    causing a series of images to be captured by a multi-channel image sensor in conjunction with the series of colored flashes;
    calculating a training fingerprint for each pixel of each image of the series of images;
    setting up linear regression using the training fingerprints and the training reflectances; and
    forming a reflectance characterization matrix by performing multiple linear regression for each wavelength within a predetermined spectrum.

2. The method of claim 1, further comprising:
    applying the reflectance characterization to one or more calculated fingerprints to facilitate the generation of a reflectance profile for an object.

3. The method of claim 2, further comprising:
    acquiring a new image of a scene that includes the object;
    identifying one or more pixels in the new image corresponding to the object; and
    calculating a fingerprint for each of the one or more pixels.

4. The method of claim 1, wherein the predetermined spectrum corresponds to the visible spectrum between 400 nanometers (nm) and 700 nm.

5. The method of claim 1, wherein a number of elements in each training fingerprint corresponds to a number of color channels in the multi-channel light source multiplied by a number of sensor channels in the multi-channel image sensor.

6. The method of claim 5,
    wherein the multi-channel light source includes five color channels,
    wherein the multi-channel image sensor includes three sensor channels, and wherein each training fingerprint includes fifteen elements.

7. The method of claim 1, further comprising:
generating a training equation for each training reflectance;
performing ordinary least squares regression on the training equations to determine a series of coefficient values at each wavelength within the predetermined spectrum; and
populating each wavelength-specific row in the reflectance characterization matrix with the corresponding series of coefficient values.

8. The method of claim 7, further comprising:
acquiring a new image of a scene that includes an object; and
calculating reflectance of the object, at each wavelength in the predetermined spectrum, by taking the dot product of a wavelength-appropriate row in the reflectance characterization matrix and a calculated fingerprint derived from the new image.

9. A method for creating an illuminance characterization matrix, the method comprising:
illuminating training reflectances by producing a series of flashes by sequentially illuminating a series of training illuminants;
causing a series of images to be captured by a multi-channel image sensor in conjunction with the series of flashes;
calculating a training fingerprint for each training illuminant of the series of training illuminants;
setting up linear regression using the training fingerprints and the series of training illuminants; and
forming an illuminance characterization matrix by performing multiple linear regression for each wavelength within a predetermined spectrum.

10. The method of claim 9, wherein each training reflectance is a color evaluation sample (CES) associated with Illuminating Engineering Society (IES) Technical Memorandum (TM) 30-15.

11. The method of claim 9, wherein each training illuminant is produced by a different light source.

12. The method of claim 9, wherein each training illuminant is produced by a multi-channel light source capable of producing light having different correlated color temperatures (CCTs).

13. The method of claim 9, further comprising:
applying the illuminance characterization matrix to one or more calculated fingerprints to facilitate the generation of an illuminance profile for light reflected off the training reflectances.

14. The method of claim 9, wherein a number of elements in each training fingerprint corresponds to a number of sensor channels in the multi-channel image sensor multiplied by a number of training reflectances.

15. The method of claim 9, further comprising:
generating a training equation for each training illuminant;
performing ordinary least squares regression on the training equations to determine a series of coefficient values at each wavelength within the predetermined spectrum; and
populating each wavelength-specific row in the illuminance characterization matrix with the corresponding series of coefficient values.

16. The method of claim 15, further comprising:
acquiring a new image of the training reflectances; and
calculating illuminance of light reflected off the training reflectances, at each wavelength in the predetermined spectrum, by taking the dot product of a wavelength-appropriate row in the illuminance characterization matrix and a calculated fingerprint derived from the new image.

17. A method for creating a sensor response characterization matrix, the method comprising:
illuminating training reflectances by producing a series of flashes by sequentially illuminating a training illuminant;
causing a series of images to be captured by a series of training image sensors in conjunction with the series of flashes;
calculating a training fingerprint for each training image sensor of the series of training image sensors;
setting up linear regression using the training fingerprints and the series of training image sensors; and
forming a response characterization matrix by performing multiple linear regression for each wavelength within a predetermined spectrum.

18. The method of claim 17, further comprising:
applying the response characterization matrix to one or more calculated fingerprints to facilitate the generation of a response profile for an image sensor used to produce an image of the training reflectances.

19. The method of claim 17, further comprising:
generating a training equation for each training image sensor;
performing ordinary least squares regression on the training equations to determine a series of coefficient values at each wavelength within the predetermined spectrum; and
populating each wavelength-specific row in the response characterization matrix with the corresponding series of coefficient values.

20. The method of claim 19, further comprising:
acquiring a new image of the training reflectances; and
calculating response of each sensor channel of an image sensor responsible for producing the new image, at each wavelength in the predetermined spectrum, by taking the dot product of a wavelength-appropriate row in the response characterization matrix and a calculated fingerprint derived from the new image.

* * * * *